US012500394B2

(12) United States Patent
Tachikawa et al.

(10) Patent No.: US 12,500,394 B2
(45) Date of Patent: Dec. 16, 2025

(54) SURFACE EMITTING LASER, SURFACE EMITTING LASER ARRAY, ELECTRONIC DEVICE, AND METHOD FOR MANUFACTURING SURFACE EMITTING LASER

(71) Applicant: SONY SEMICONDUCTOR SOLUTIONS CORPORATION, Kanagawa (JP)

(72) Inventors: Yoshiteru Tachikawa, Kumamoto (JP); Shinichi Agatuma, Kumamoto (JP); Masato Ogawa, Kumamoto (JP); Hitoshi Domon, Kumamoto (JP); Masato Oishi, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 621 days.

(21) Appl. No.: 17/906,360

(22) PCT Filed: Feb. 9, 2021

(86) PCT No.: PCT/JP2021/004764
§ 371 (c)(1),
(2) Date: Sep. 15, 2022

(87) PCT Pub. No.: WO2021/192672
PCT Pub. Date: Sep. 30, 2021

(65) Prior Publication Data
US 2023/0178963 A1 Jun. 8, 2023

(30) Foreign Application Priority Data
Mar. 27, 2020 (JP) .............................. 2020-057521

(51) Int. Cl.
*H01S 5/183* (2006.01)

(52) U.S. Cl.
CPC ...... *H01S 5/18361* (2013.01); *H01S 5/18327* (2013.01); *H01S 5/18347* (2013.01); *H01S 5/18311* (2013.01); *H01S 5/18358* (2013.01)

(58) Field of Classification Search
CPC ............ H01S 5/18311; H01S 5/18327; H01S 5/18347; H01S 5/18358; H01S 5/18361
See application file for complete search history.

(56) References Cited

U.S. PATENT DOCUMENTS 6,720,585 B1 * 4/2004 Wasserbauer ...... H10H 20/8142
257/97
2002/0150135 A1 * 10/2002 Naone ................. H01S 5/18369
372/45.011

(Continued)

FOREIGN PATENT DOCUMENTS

JP 06-314854 A 11/1994
JP 11-068227 A 3/1999

(Continued)

OTHER PUBLICATIONS

Translation of JP 2004-221492 (Year: 2004).*

(Continued)

*Primary Examiner* — James A Menefee
(74) *Attorney, Agent, or Firm* — CHIP LAW GROUP

(57) ABSTRACT

Provided is a surface emitting laser that includes a first multilayer film reflector, a second multilayer film reflector, and an active layer between the first multilayer film reflector and the second multilayer film reflector. In at least one of the first multilayer film reflector or the second multilayer film reflector, a high-concentration impurity region having a higher impurity concentration than other regions is partially provided in a thickness direction. According to the present (Continued)

technology, there is provided a surface emitting laser capable of reducing resistance while suppressing a decrease in manufacturing efficiency.

18 Claims, 29 Drawing Sheets

(56) References Cited

U.S. PATENT DOCUMENTS

| | | | | |
|---|---|---|---|---|
| 2004/0075908 | A1* | 4/2004 | Chen | G02B 5/0833 359/585 |
| 2010/0189467 | A1* | 7/2010 | Sato | H01S 5/18358 372/46.013 |
| 2011/0096803 | A1* | 4/2011 | Johnson | H01S 5/18344 257/E33.068 |
| 2011/0176122 | A1* | 7/2011 | Kaminishi | B82Y 20/00 359/205.1 |
| 2017/0317472 | A1 | 11/2017 | Ledentsov et al. | |
| 2018/0041010 | A1 | 2/2018 | Dallesasse | |
| 2021/0135428 | A1* | 5/2021 | Hamaguchi | H01S 5/34333 |

FOREIGN PATENT DOCUMENTS

| | | |
|---|---|---|
| JP | 3091855 U | 2/2003 |
| JP | 2003-124570 A | 4/2003 |
| JP | 2004-221492 A | 8/2004 |
| JP | 2005-044964 A | 2/2005 |
| JP | 2009-194102 A | 8/2009 |
| JP | 2009-206480 A | 9/2009 |
| JP | 2011135029 A | 7/2011 |
| JP | 2011-166108 A | 8/2011 |
| WO | 2015/011966 A1 | 1/2015 |

OTHER PUBLICATIONS

Translation of JP 2011-135029 (Year: 2011).*
International Search Report and Written Opinion of PCT Application No. PCT/JP2021/004764, issued on Apr. 20, 2021, 12 pages of ISRWO.

* cited by examiner

SURFACE EMITTING LASER, SURFACE EMITTING LASER ARRAY, ELECTRONIC DEVICE, AND METHOD FOR MANUFACTURING SURFACE EMITTING LASER

CROSS REFERENCE TO RELATED APPLICATIONS

This application is a U.S. National Phase of International Patent Application No. PCT/JP2021/004764 filed on Feb. 9, 2021, which claims priority benefit of Japanese Patent Application No. JP 2020-057521 filed in the Japan Patent Office on Mar. 27, 2020. Each of the above-referenced applications is hereby incorporated herein by reference in its entirety.

TECHNICAL FIELD

The technology according to the present disclosure (hereinafter also referred to as "the present technology") relates to a surface emitting laser, a surface emitting laser array, an electronic device, and a method for manufacturing a surface emitting laser.

BACKGROUND ART

Conventionally, a surface emitting laser in which an active layer is disposed between a lower multilayer film reflector and an upper multilayer film reflector is known.

Some conventional surface emitting lasers have a region having a high impurity concentration in the entire region of the upper multilayer film reflector in the thickness direction (see, for example, Patent Document 1).

CITATION LIST

Patent Document

Patent Document 1: Japanese Patent Application Laid-Open No. 11-68227

SUMMARY OF THE INVENTION

Problems to be Solved by the Invention

However, in the conventional surface emitting laser, there has been room for improvement in reducing the resistance while suppressing a decrease in manufacturing efficiency.

Therefore, an object of the present technology is to provide a surface emitting laser capable of reducing resistance while suppressing a decrease in manufacturing efficiency, a surface emitting laser array including the surface emitting laser, an electronic device including the surface emitting laser array, and a method for manufacturing the surface emitting laser.

Solutions to Problems

The present technology provides a surface emitting laser including:
   a first multilayer film reflector;
   a second multilayer film reflector; and
   an active layer disposed between the first multilayer film reflector and the second multilayer film reflector,
   in which in the first multilayer film reflector and/or the second multilayer film reflector, a high-concentration impurity region having a higher impurity concentration than other regions is partially provided in a thickness direction.

It is preferable that the high-concentration impurity region be partially provided in an in-plane direction of the first multilayer film reflector and/or the second multilayer film reflector.

The high-concentration impurity region may be provided at least on a surface layer farther from the active layer of the first multilayer film reflector and/or the second multilayer film reflector.

It is preferable that the high-concentration impurity region be not provided at least on a surface layer closer to the active layer of the first multilayer film reflector and/or the second multilayer film reflector.

The first multilayer film reflector and/or the second multilayer film reflector may include a first layer, and a second layer provided with the high-concentration impurity region.

It is preferable that the first layer be relatively closer to the active layer and the second layer be relatively farther from the active layer.

One or more pairs of undoped or lightly doped refractive index layers of $1 \times 10^{18}$ cm$^{-3}$ or less or undoped or lightly doped GaAs layers of $1 \times 10^{18}$ cm$^{-3}$ or less may be disposed between the second layer and the active layer.

The refractive index layer or the GaAs layer may be disposed between the second layer and the first layer.

It is preferable that the first layer have one or more pairs of refractive index layers, at least one of which contains Al in a composition, the second layer have one or more pairs of refractive index layers, at least one of which contains Al in a composition, and a ratio of an optical thickness of a refractive index layer having a higher Al composition to an optical thickness of a refractive index layer having a lower Al composition in the pairs of the second layer be larger than a ratio of an optical thickness of a refractive index layer having a higher Al composition to an optical thickness of a refractive index layer having a lower Al composition in the pairs of the first layer.

It is preferable that a sum of optical thicknesses of the refractive index layers constituting the pairs of the first layer and a sum of optical thicknesses of the refractive index layers constituting the pairs of the second layer be substantially the same.

The surface emitting laser may further include a standing wave adjustment layer disposed between the second layer and the first layer.

It is preferable that the standing wave adjustment layer have a layer containing Al in a composition, and an optical thickness of the layer containing Al in the composition be thicker than an optical thickness of a refractive index layer having a higher Al composition in the pairs of the first layer, and be thinner than an optical thickness of a refractive index layer having a higher Al composition in the pairs of the second layer.

It is preferable that the standing wave adjustment layer have a layer containing Al in a composition, and an optical thickness of the layer containing Al in the composition be thinner than an optical thickness of a refractive index layer having a lower Al composition in the pairs of the first layer, and be thicker than an optical thickness of a refractive index layer having a lower Al composition in the pairs of the second layer.

The surface emitting laser may have an oscillation wavelength of 900 nm or more.

The present technology also provides a surface emitting laser array in which the surface emitting lasers are two-dimensionally arranged.

The present technology also provides an electronic device including the surface emitting laser.

The present technology also provides a method for manufacturing a surface emitting laser, the method including:

a step of generating a laminate by laminating at least a first multilayer film reflector, an active layer, and a second multilayer film reflector in this order;

a step of forming an insulating film on a side opposite to the active layer side with respect to the second multilayer film reflector of the laminate;

a step of etching the insulating film to form an opening; and a step of diffusing impurities into a part of a layer including a surface layer farther from the active layer of the second multilayer film reflector via the opening.

It is preferable that in the step of diffusing the impurities, the impurities be not diffused at least into a surface layer relatively closer to the active layer of the second multilayer film reflector.

In the step of generating the laminate, a diffusion suppression layer that suppresses diffusion of the impurities may be laminated on the active layer before all of the second multilayer film reflector is laminated on the active layer.

The second multilayer film reflector may include a first layer and a second layer provided with a high-concentration impurity region having a higher impurity concentration than other regions, the first layer may have one or more pairs of refractive index layers, at least one of which contains Al in a composition, the second layer may have one or more pairs of refractive index layers, at least one of which contains Al in a composition, a ratio of an optical thickness of a refractive index layer having a higher Al composition to an optical thickness of a refractive index layer having a lower Al composition in the pairs of the second layer may be larger than a ratio of an optical thickness of a refractive index layer having a higher Al composition to an optical thickness of a refractive index layer having a lower Al composition in the pairs of the first layer, and in the step of generating the laminate, the first layer may be laminated on the active layer, a standing wave adjustment layer may be laminated on the first layer, and the second layer may be laminated on the standing wave adjustment layer.

MODE FOR CARRYING OUT THE INVENTION

Figure 1:
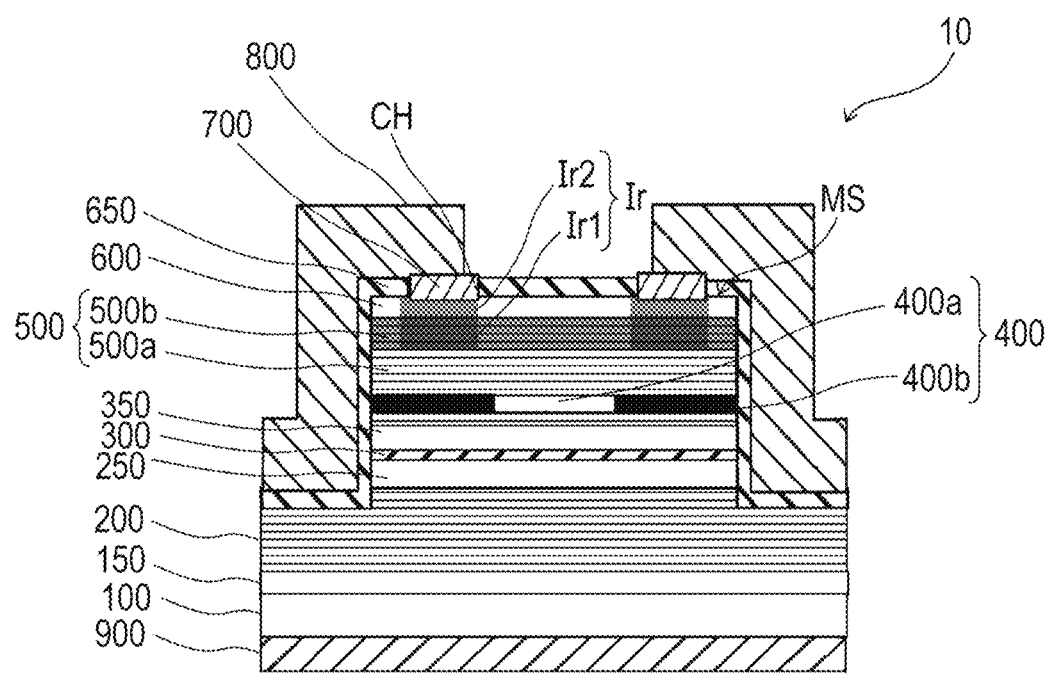
FIG. 1 is a cross-sectional view illustrating a configuration of a surface emitting laser according to a first embodiment of the present technology.

Hereinafter, preferred embodiments of the present technology will be described in detail with reference to the accompanying drawings. Note that, in the present specification and the drawings, components having substantially the same functional configuration are denoted by the same reference numerals, and redundant description will be omitted. The embodiments described below illustrate representative embodiments of the present technology, and the scope of the present technology is not to be narrowly interpreted by these embodiments. In the present specification, even in a case where it is described that each of a surface emitting laser, a surface emitting laser array, an electronic device, and a method for manufacturing a surface emitting laser according to the present technology exhibits a plurality of effects, it is sufficient if each of the surface emitting laser, the surface emitting laser array, the electronic device, and the method for manufacturing a surface emitting laser according to the present technology exhibits at least one effect. The effects described in the present specification are merely examples and are not limited, and other effects may be provided.

In addition, description will be given in the following order.
1. Surface emitting laser according to first embodiment of present technology
   (1) Configuration of surface emitting laser according to first embodiment of present technology
   (2) Method for Manufacturing Surface Emitting Laser According to First Embodiment of Present Technology
   (3) Action of surface emitting laser according to first embodiment of present technology
   (4) Effects of surface emitting laser according to first embodiment of present technology
2. Surface emitting laser according to modification 1 of first embodiment of present technology
3. Surface emitting laser according to modification 2 of first embodiment of present technology
4. Surface emitting laser according to second embodiment of present technology
5. Surface emitting laser according to third embodiment of present technology
6. Surface emitting laser according to fourth embodiment of present technology
7. Surface emitting laser according to fifth embodiment of present technology
8. Surface emitting laser according to sixth embodiment of present technology
9. Modification of present technology
10. Example of use of surface emitting laser to which present technology is applied Application Example to Electronic Device 1. <Surface Emitting Laser According to First Embodiment of Present Technology>

(1) Configuration of Surface Emitting Laser According to First Embodiment of Present Technology FIG. 1 is a cross-sectional view illustrating a configuration of a surface emitting laser 10 according to a first embodiment of the present technology. Hereinafter, for the sake of convenience, the upper part in the cross-sectional view of FIG. 1 and the like will be described as an upper side, and the lower part in the cross-sectional view of FIG. 1 and the like will be described as a lower side.

Hereinafter, a case where a surface emitting laser array in which a plurality of surface emitting lasers 10 is two-dimensionally arranged is configured will be described as an example. In FIG. 1, one surface emitting laser 10 of the surface emitting laser array is extracted and illustrated.

(Overall Configuration)

As illustrated in FIG. 1, the surface emitting laser 10 has a laminated structure in which a first multilayer film reflector 200, an active layer 300, and a second multilayer film reflector 500 are laminated in this order on a substrate 100.

That is, in the surface emitting laser 10, the active layer 300 is disposed between the first multilayer film reflector 200 and the second multilayer film reflector 500.

The surface emitting laser according to the present technology preferably has an oscillation wavelength of 900 nm or more.

In the present embodiment, the oscillation wavelength of the surface emitting laser 10 is, for example, 940 nm.

Note that the surface emitting laser according to the present technology may have an oscillation wavelength of less than 900 nm.

As an example, the substrate 100 is a first conductivity type (for example, n-type) GaAs substrate.

A buffer layer 150 is disposed between the surface (upper surface) of the substrate 100 on the first multilayer film reflector 200 side and the first multilayer film reflector 200.

A first conductivity type (for example, n-type) cathode electrode 900 is provided on a surface (lower surface) of the substrate 100 opposite to the first multilayer film reflector 200 side.

The cathode electrode 900 may have a single layer structure or a laminated structure.

The cathode electrode 900 is made of, for example, at least one metal (including an alloy) selected from the group consisting of Au, Ag, Pd, Pt, Ni, Ti, V, W, Cr, Al, Cu, Zn, Sn, and In.

In a case where the cathode electrode 900 has a laminated structure, the cathode electrode includes, for example, a material such as Ti/Au, Ti/Al, Ti/Al/Au, Ti/Pt/Au, Ni/Au, Ni/Au/Pt, Ni/Pt, Pd/Pt, or Ag/Pd.

As an example, the first multilayer film reflector 200 is a semiconductor multilayer film reflector. The multilayer film reflector is also referred to as a distributed Bragg reflector. A semiconductor multilayer film reflector which is a type of multilayer film reflector (distributed Bragg reflector) has low light absorption, high reflectance, and conductivity. The first multilayer film reflector 200 is also referred to as a lower DBR.

As an example, the first multilayer film reflector 200 is a first conductivity type (for example, n-type) semiconductor multilayer film reflector, and has a structure in which a plurality of types (for example, two types) of semiconductor layers (refractive index layers) having different refractive indexes is alternately laminated with an optical thickness of ¼ ($\lambda/4$) of an oscillation wavelength $\lambda$. Each refractive index layer of the first multilayer film reflector 200 includes a first conductivity type (for example, n-type) AlGaAs-based compound semiconductor.

The active layer 300 has a quantum well structure including a barrier layer including, for example, an AlGaAs-based compound semiconductor and a quantum well layer. This quantum well structure may be a single quantum well structure (QW structure) or a multiple quantum well structure (MQW structure).

A first spacer layer 250 (lower spacer layer) is disposed between the first multilayer film reflector 200 and the active layer 300. The first spacer layer 250 includes a first conductivity type (for example, n-type) AlGaAs-based compound semiconductor. The "spacer layer" is also referred to as a "cladding layer".

As an example, the second multilayer film reflector 500 is a second conductivity type (for example, p-type or n-type) semiconductor multilayer film reflector, and has a structure in which a plurality of types (for example, two types) of semiconductor layers (refractive index layers) having different refractive indexes is alternately laminated with an optical thickness of ¼ wavelength of the oscillation wavelength. Each refractive index layer of the second multilayer film reflector 200 includes a second conductivity type (for example, p-type or n-type) AlGaAs-based compound semiconductor. The second multilayer film reflector 500 will be described in more detail below.

A current confinement layer 400 is disposed inside the second multilayer film reflector 500.

As an example, the current confinement layer 400 includes a non-oxidized region 400a including AlAs and an oxidized region 400b including an oxide of AlAs (for example, $Al_2O_3$) surrounding the non-oxidized region.

A second spacer layer 350 (upper spacer layer) is disposed between the second multilayer film reflector 500 and the active layer 300. The second spacer layer 350 includes a second conductivity type (for example, p-type) AlGaAs-based compound semiconductor. The "spacer layer" is also referred to as a "cladding layer".

A contact layer 600 is disposed on the second multilayer film reflector 500. The contact layer 600 includes a second conductivity type (for example, p-type) GaAs-based compound semiconductor.

Here, a mesa structure MS functioning as a laser resonator of the surface emitting laser 10 is formed on a part (lower part) of the first multilayer film reflector 200.

That is, the mesa structure MS includes, as an example, the other part (upper part) of the first multilayer film reflector 200, the first spacer layer 250, the active layer 300, the second spacer layer 350, the current confinement layer 400, the second multilayer film reflector 500, and the contact layer 600.

The cathode electrode 900, the substrate 100, the buffer layer 150, and a part (lower part) of the first multilayer film reflector are shared by the plurality of surface emitting lasers 10.

The mesa structure MS has, for example, a substantially cylindrical shape in plan view, but may have another columnar shape such as a substantially elliptical columnar shape or a polygonal columnar shape.

The mesa structure MS and a peripheral portion thereof are covered with an insulating film 650. The insulating film 650 includes, for example, $SiO_2$, SiN, SiON, or the like.

A contact hole CH for electrode extraction is formed in the insulating film 650 covering the top of the mesa structure MS.

The contact hole CH is formed (for example, in an annular shape) to surround the non-oxidized region 400a of the current confinement layer 400 when viewed from a height direction of the mesa structure MS, for example.

A second conductivity type (for example, p-type) anode electrode 700 is disposed in the contact hole CH. The anode electrode 700 has, for example, substantially the same shape (for example, an annular shape) as the contact hole CH when viewed from the height direction of the mesa structure MS. A surface (lower surface) of the anode electrode 700 on the contact layer 600 side is in contact with the contact layer 600.

The anode electrode 700 may have a single layer structure or a laminated structure.

The anode electrode 700 includes, for example, at least one metal (including an alloy) selected from the group consisting of Au, Ag, Pd, Pt, Ni, Ti, V, W, Cr, Al, Cu, Zn, Sn, and In.

In a case where the anode electrode 700 has a laminated structure, the anode electrode includes, for example, a material such as Ti/Au, Ti/Al, Ti/Al/Au, Ti/Pt/Au, Ni/Au, Ni/Au/Pt, Ni/Pt, Pd/Pt, or Ag/Pd.

The insulating film 650 is covered with a wiring layer 800 except for a portion covering the center of the top of the mesa structure MS. The wiring layer 800 includes, for example, gold plating.

That is, in the wiring layer 800, an opening is formed at a position corresponding to the top of the mesa structure MS, and the opening is an emission port of the surface emitting laser 10.

The wiring layer 800 is connected to an electrode pad (not illustrated) disposed around the surface emitting laser array.

Here, the contact layer 600 is located on the emission side of the mesa structure MS constituting the laser resonator. Therefore, the thickness of the contact layer 600 is preferably, for example, 1 µm or less. In a case where the thickness of the contact layer 600 is 1 µm or less, light absorption in the contact layer 600 can be reduced, and a decrease in light output can be suppressed.

[Configuration of Second Multilayer Film Reflector]

In the second multilayer film reflector 500, a high-concentration impurity region Ir (gray portion in FIG. 1) having a higher impurity concentration than other regions is partially provided in a thickness direction.

"Other regions" described above mean a region other than the high-concentration impurity region Ir in the second multilayer film reflector 500.

Specifically, the high-concentration impurity region Ir is provided at least on a surface layer farther from the active layer 300 of the second multilayer film reflector 500.

Furthermore, the high-concentration impurity region Ir is not provided at least on a surface layer closer to the active layer 300 of the second multilayer film reflector.

More specifically, the second multilayer film reflector 500 includes a first layer 500a and a second layer 500b provided with the high-concentration impurity region Ir.

The first layer 500a and the second layer 500b are laminated. A lamination direction of the first layer 500a and the second layer 500b coincides with an arrangement direction (vertical direction) of the first and second multilayer film reflectors 200 and 500 and the active layer 300.

The first layer 500a is relatively closer to the active layer 300 and the second layer 500b is relatively farther from the active layer 300.

(High-Concentration Impurity Region)

The high-concentration impurity region Ir is preferably provided in at least a part of the second layer 500b in the thickness direction. In the present embodiment, the high-concentration impurity region Ir is provided in the entire region of the second layer 500b in the thickness direction.

On the other hand, in the present embodiment, the high-concentration impurity region Ir is not provided in the first layer 500a.

The high-concentration impurity region Ir includes ions such as zinc (Zn), boron (B), silicon (Si), and beryllium ions, for example.

The impurity concentration of the high-concentration impurity region Ir is preferably substantially uniform over the entire high-concentration impurity region Ir, but may vary slightly.

In the present embodiment, the optical thickness (total thickness) of the second layer 500b is thinner than the optical thickness (total thickness) of the first layer 500a.

Note that the optical thickness of the second layer 500b may be thicker than the optical thickness of the first layer 500a, or may be equal to the optical thickness of the first layer 500a.

The high-concentration impurity region Ir is partially provided in an in-plane direction of the second multilayer film reflector 500.

Specifically, the high-concentration impurity region Ir is provided in the peripheral portion of the central portion where an optical waveguide of the mesa structure MS is formed.

More specifically, the high-concentration impurity region Ir is provided in, for example, an annular shape to surround the non-oxidized region 400a of the current confinement layer 400 when viewed from the height direction of the mesa structure MS.

The difference between the outer diameter and the inner diameter of the high-concentration impurity region Ir is preferably 1 μm or more.

The high-concentration impurity region Ir includes a portion Ir1 located in the second layer 500b and a protrusion Ir2 continuous with the portion Ir1 and protruding from the second layer 500b to the side opposite to the first layer 500a side. At least a part of the protrusion Ir2 is disposed in the contact layer 600.

That is, the high-concentration impurity region Ir is provided across the contact layer 600 and the second multilayer film reflector 500.

The high-concentration impurity region Ir has substantially the same diameter and the same size as, for example, the anode electrode 700 when viewed from the height direction of the mesa structure MS.

The protrusion Ir2 is in contact with the anode electrode 700.

That is, the protrusion Ir2 is formed in a region (contact region) in contact with the anode electrode 700 in the contact layer 600.

As can be seen from the above description, the high-concentration impurity region Ir is provided on a current path between the anode electrode 700 and the active layer 300.

The portion Ir2 has electrical low resistance (excellent conductivity) as compared with a portion of the second layer 500b where the high-concentration impurity region Ir is not provided.

The protrusion Ir2 has electrical low resistance (excellent conductivity) as compared with a portion of the contact layer 600 where the high-concentration impurity region Ir is not provided.

(Configuration of First Layer)

The first layer 500a has one or more pairs of refractive index layers, at least one of which contains Al in a composition. Each refractive index layer of the pair has a different refractive index from each other. Each refractive index layer of the pair includes, for example, an AlGaAs-based compound semiconductor.

An Al composition of the refractive index layer (low refractive index layer) having a higher Al composition in the pairs of the first layer 500a is preferably 0.7 (70%) or more, more preferably 0.8 (80%) or more, and still more preferably 0.9 (90%) or more. The Al composition is preferably 0.99 or less.

Here, the Al composition is, for example, within a range of any of 0.9 to 0.93, 0.93 to 0.96, and 0.96 to 0.99. Note that the the Al composition may be less than 0.7 (70%).

An Al composition of the refractive index layer (high refractive index layer) having a lower Al composition in the pairs of the first layer 500a is preferably 0.03 (3%) or more, more preferably 0.05 (5%) or more, still more preferably 0.1 (10%) or more, and even still more preferably 0.3 (30%) or more. The Al composition is preferably 0.4 (40%) or less.

Here, the Al composition is, for example, within a range of any of 0.1 to 0.2, 0.2 to 0.3, and 0.3 to 0.4. Note that the Al composition may be less than 0.03.

Here, as the Al composition of each refractive index layer of the pairs of the first layer 500a is higher, the heat dissipation is improved, and as the refractive index difference between the refractive index layers of the pairs of the first layer 500a is higher (as the difference in Al composition is larger), the reflectance is improved. Therefore, it is preferable to determine the Al composition of each refractive index layer of the pairs of the first layer 500a in consideration of the balance between the target heat dissipation and reflectance.

An optical thickness Ota-H of the refractive index layer (low refractive index layer) having a higher Al composition in the pairs of the first layer 500a is, for example, 56.9 nm.

An optical thickness Ota-L of the refractive index layer (high refractive index layer) having a lower Al composition in the pairs of the first layer 500a is, for example, 51.2 nm.

(Configuration of Second Layer) The second layer 500b has one or more pairs of refractive index layers, at least one of which contains Al in a composition. Each refractive index layer of the pair has a different refractive index from each other. Each refractive index layer of the pair includes, for example, an AlGaAs-based compound semiconductor.

An Al composition of the refractive index layer (low refractive index layer) having a higher Al composition in the pairs of the second layer 500b is preferably 0.7 (70%) or more, more preferably 0.8 (80%) or more, and still more preferably 0.9 (90%) or more. The Al composition is preferably 0.99 or less.

Here, the Al composition is, for example, within a range of any of 0.9 to 0.93, 0.93 to 0.96, and 0.96 to 0.99. Note that the Al composition may be less than 0.7 (70%).

An Al composition of the refractive index layer (high refractive index layer) having a lower Al composition in the pairs of the second layer 500b is preferably 0.03 (3%) or more, more preferably 0.05 (5%) or more, still more preferably 0.1 (10%) or more, and even still more preferably 0.3 (30%) or more. The Al composition is preferably 0.4 (40%) or less.

Here, the Al composition is, for example, within a range of any of 0.1 to 0.2, 0.2 to 0.3, and 0.3 to 0.4. Note that the Al composition may be less than 0.03.

Here, as the Al composition of each refractive index layer of the pairs of the second layer 500b is higher, the heat dissipation is improved, and as the refractive index difference between the refractive index layers of the pairs of the second layer 500b is higher (as the difference in Al composition is larger), the more the reflectance is improved. Therefore, it is preferable to determine the Al composition of each refractive index layer of the pairs of the second layer 500b in consideration of the balance between the target heat dissipation and reflectance.

An optical thickness Otb-H of the refractive index layer (low refractive index layer) having a higher Al composition in the pairs of the second layer 500b is, for example, 69.3 nm.

An optical thickness Otb-L of the refractive index layer (high refractive index layer) having a lower Al composition in the pairs of the second layer 500b is, for example, 39.1 nm.

A ratio Rb-HL of the optical thickness Otb-H of the refractive index layer having a higher Al composition to the optical thickness Otb-L of the refractive index layer having a lower Al composition in the pairs of the second layer 500b is, for example, 69.3/39.1≈1.77.

On the other hand, a ratio Ra-HL of the optical thickness Ota-H of the refractive index layer having a higher Al composition to the optical thickness Ota-L of the refractive index layer having a lower Al composition in the pairs of the first layer 500a is, for example, 56.9/51.2≈1.11.

That is, Rb-HL>Ra-HL holds.

A ratio Rab-HH of the optical thickness Otb-H of the refractive index layer having a higher Al composition in the pairs of the second layer 500b to the optical thickness Ota-H of the refractive index layer having a higher Al composition in the pairs of the first layer 500a is preferably 1.2 or more.

In the present embodiment, the ratio Rab-HH is, for example, 69.3/56.9≈1.23.

A ratio Rab-LL of the optical thickness Otb-L of the refractive index layer having a lower Al composition in the pairs of the second layer 500b to the optical thickness Ota-L of the refractive index layer having a lower Al composition in the pairs of the first layer 500a is preferably 0.8 or less.

In the present embodiment, the ratio Rab-HH is, for example, 39.1/51.2≈0.77.

The sum of the optical thicknesses of the refractive index layers constituting the pairs of the first layer 500a (Ota-H+Ota-L) is, for example, 56.9 nm+51.2=108.1.

The sum of the optical thicknesses of the refractive index layers constituting the pairs of the second layer 500b (Otb-H+Otb-L) is, for example, 69.3+39.1=108.4.

The sum of the optical thicknesses of the refractive index layers constituting the pairs of the first layer 500a (Ota-H+Ota-L) and the sum of the optical thicknesses of the refractive index layers constituting the pairs of the second layer 500b (Otb-H+Otb-L) are substantially the same.

Note that the sum of the optical thicknesses of the refractive index layers constituting the pairs of the first layer 500a and the sum of the optical thicknesses of the refractive index layers constituting the pairs of the second layer 500b may be slightly different.

Figure 2:
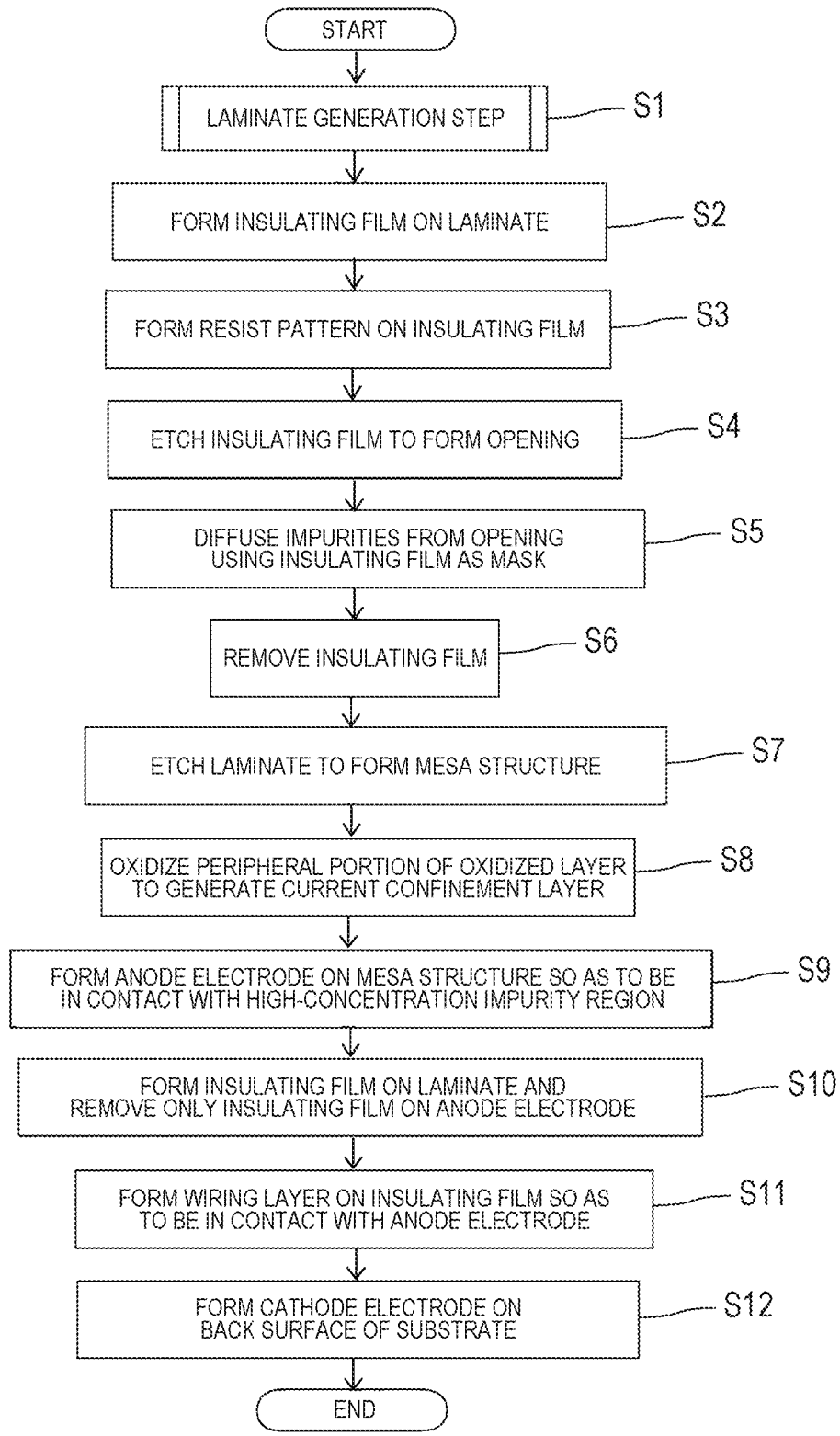
FIG. 2 is a flowchart for describing an example of a method for manufacturing the surface emitting laser according to the first embodiment of the present technology.
Figure 3:
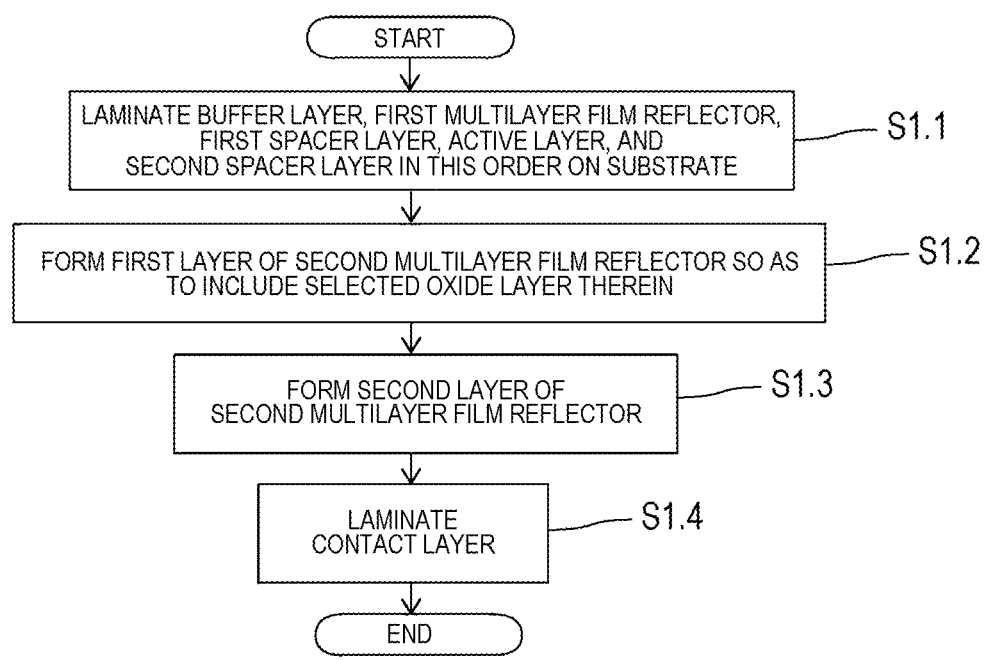
FIG. 3 is a flowchart for describing a laminate generation step in the method for manufacturing the surface emitting laser according to the first embodiment of the present technology.

(2) Method for Manufacturing Surface Emitting Laser According to First Embodiment of Present Technology Hereinafter, a method for manufacturing the surface emitting laser 10 according to the first embodiment will be described with reference to FIGS. 2 to 18. FIG. 2 is a flowchart for describing a method for manufacturing the surface emitting laser 10. FIG. 3 is a flowchart for describing a laminate generation step in the method for manufacturing the surface emitting laser 10. FIGS. 4 to 18 are cross-sectional views (process cross-sectional views) for each step of the method for manufacturing the surface emitting laser 10. Here, as an example, a plurality of surface emitting laser arrays is simultaneously generated on one wafer which is a base material of the substrate 100 by a semiconductor manufacturing method (at this time, the plurality of surface emitting lasers 10 of each surface emitting laser array is also simultaneously generated). Next, a series of a plurality of integrated surface emitting laser arrays are separated from each other to obtain a plurality of chip-like surface emitting laser arrays (surface emitting laser array chips).

In the first step S1, a laminate generation step is performed. In this laminate generation step, a laminate 5000 is generated by using a chemical vapor deposition (CVD) method, for example, a metal organic chemical vapor deposition (MOCVD) method.

In the laminate generation step, steps S1.1 to S1.4 shown in FIG. 3 are executed.

In step S1.1, the buffer layer 150, the first multilayer film reflector 200, the first spacer layer 250, the active layer 300, and the second spacer layer 350 are laminated in this order on the substrate 100.

In step S1.2, the first layer 500a of the second multilayer film reflector 500 is formed so as to include a selected oxide layer 400' therein.

In step S1.3, the second layer 500b of the second multilayer film reflector 500 is formed on the first layer 500a.

In step S1.4, the contact layer 600 is laminated on the second layer 500b.

Figure 4:
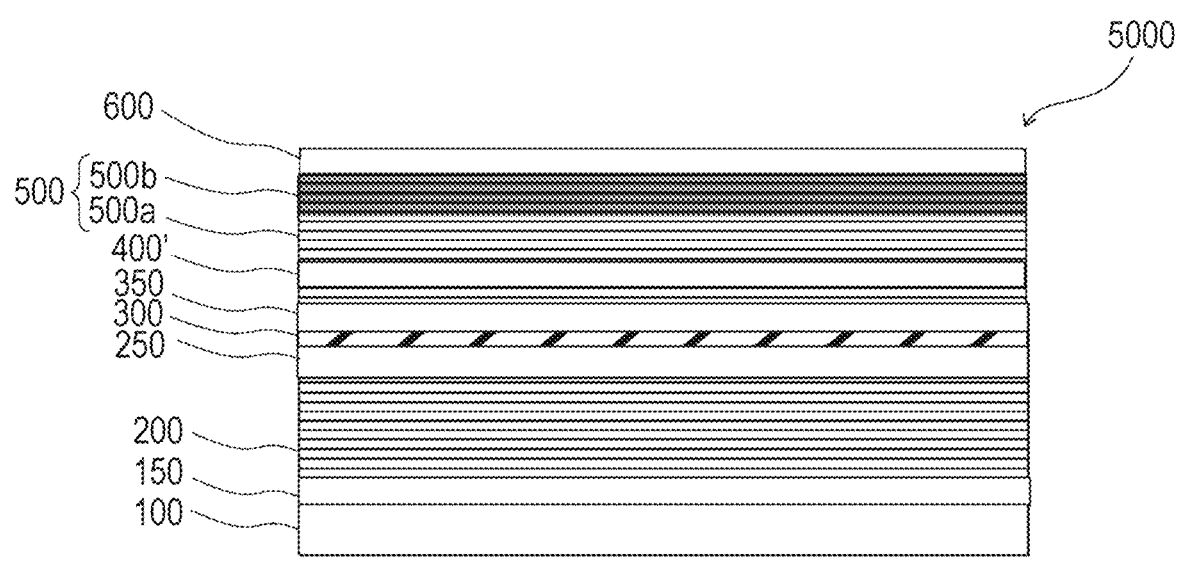
FIG. 4 is a cross-sectional view (part 1) of each step of the method for manufacturing the surface emitting laser according to the first embodiment of the present technology.

As a result, the laminate 5000 illustrated in FIG. 4 is generated.

Figure 5:
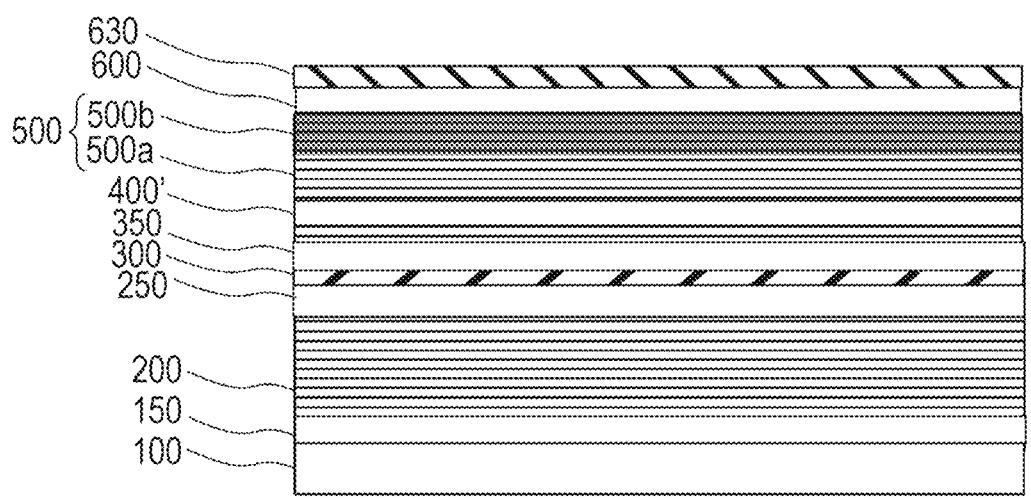
FIG. 5 is a cross-sectional view (part 2) for each step of the method for manufacturing the surface emitting laser according to the first embodiment of the present technology.

In the next step S2, as illustrated in FIG. 5, an insulating film 630 is formed on the laminate 5000. The insulating film 630 includes SiN, for example.

Figure 6:
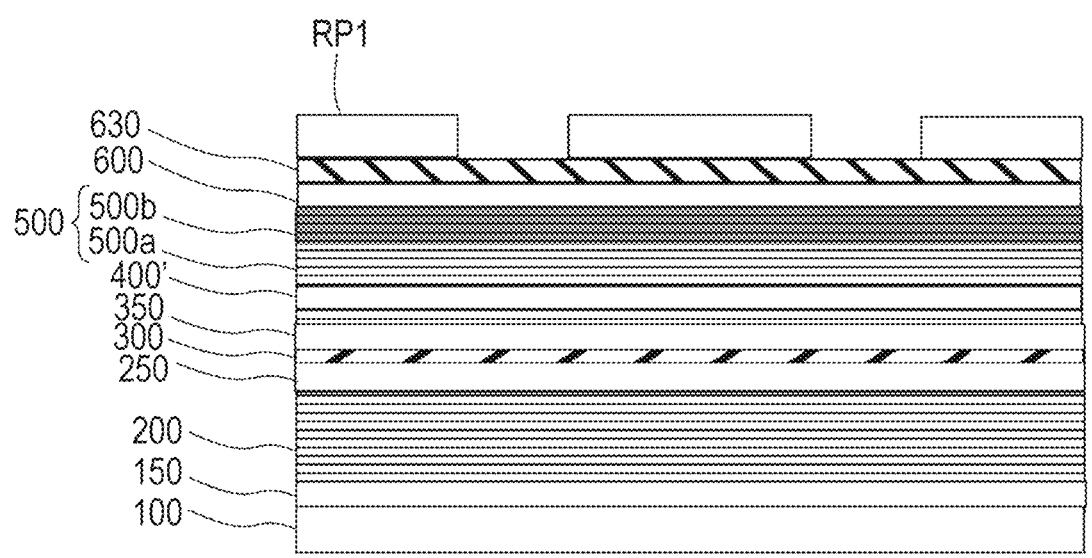
FIG. 6 is a cross-sectional view (part 3) for each step of the method for manufacturing the surface emitting laser according to the first embodiment of the present technology.

In the next step S3, as illustrated in FIG. 6, a resist pattern RP1 in which a region corresponding to a region where the high-concentration impurity region Ir is to be formed is open is formed on the insulating film 630 by photolithography.

Figure 7:
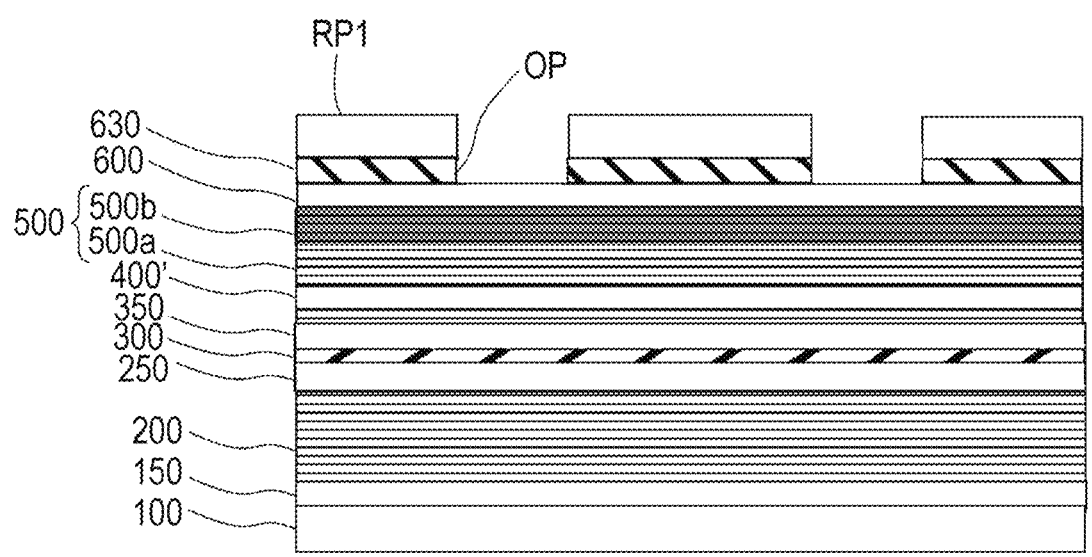
FIG. 7 is a cross-sectional view (part 4) for each step of the method for manufacturing the surface emitting laser according to the first embodiment of the present technology.
Figure 8:
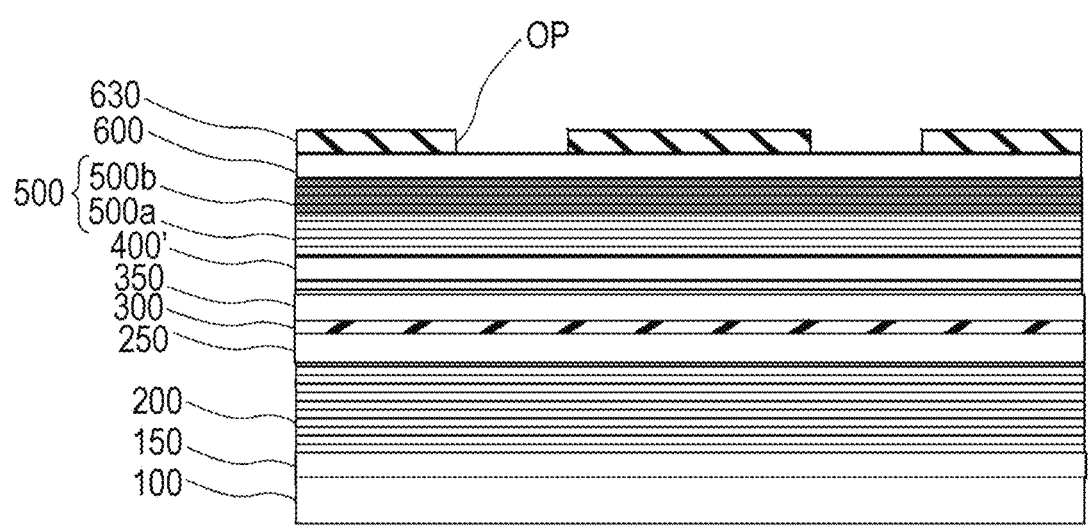
FIG. 8 is a cross-sectional view (part 5) of each step of the method for manufacturing the surface emitting laser according to the first embodiment of the present technology.

In the next step S4, as illustrated in FIG. 7, using the resist pattern RP1 as a mask, the insulating film 630 is selectively etched using, for example, a hydrofluoric acid-based etchant to form an opening OP. Thereafter, as illustrated in FIG. 8, the resist pattern RP1 is removed.

Figure 9:
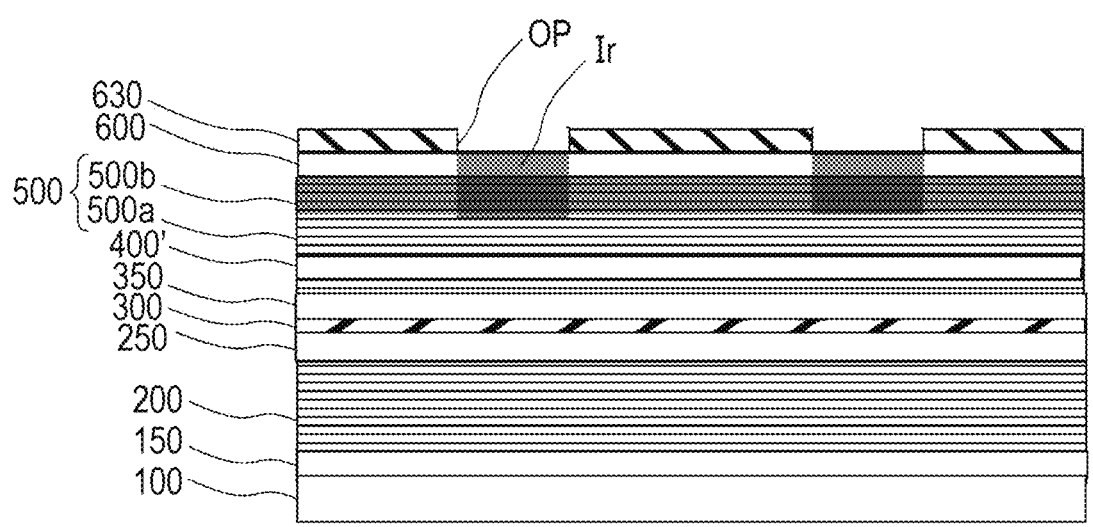
FIG. 9 is a cross-sectional view (part 6) for each step of the method for manufacturing the surface emitting laser according to the first embodiment of the present technology.

In the next step S5, as illustrated in FIG. 9, impurities are diffused from the opening OP using the insulating film 630 as a mask to form the high-concentration impurity region Ir.

Specifically, for example, impurities such as Zn are injected and diffused from the opening OP via the contact layer 600 by a method such as gas phase or solid phase diffusion. For example, in the high-concentration impurity region Ir, an injection amount, an injection speed, and an injection time of the impurities are adjusted such that the impurities are diffused into a part of the layer including the surface layer of the second multilayer film reflector 500. Here, impurities are diffused over the entire region of the second layer 500b in the thickness direction. At this time, the insulating film 630 serves as a mask during impurity diffusion.

Figure 10:
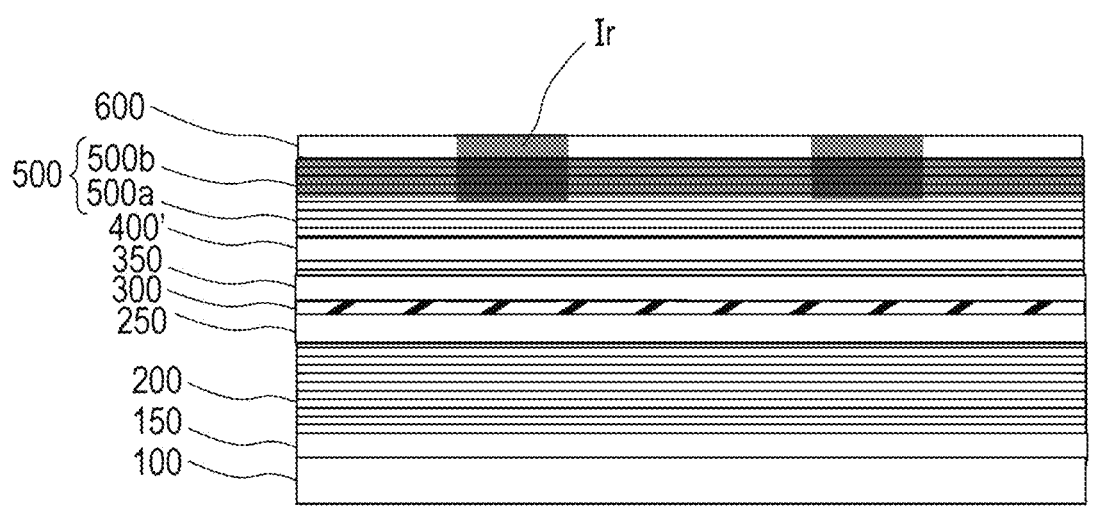
FIG. 10 is a cross-sectional view (part 7) for each step of the method for manufacturing the surface emitting laser according to the first embodiment of the present technology.

In the next step S6, as illustrated in FIG. 10, the insulating film 630 is removed.

In the next step S7, the laminate provided with the high-concentration impurity region Ir is etched to form the mesa structure MS.

Figure 11:
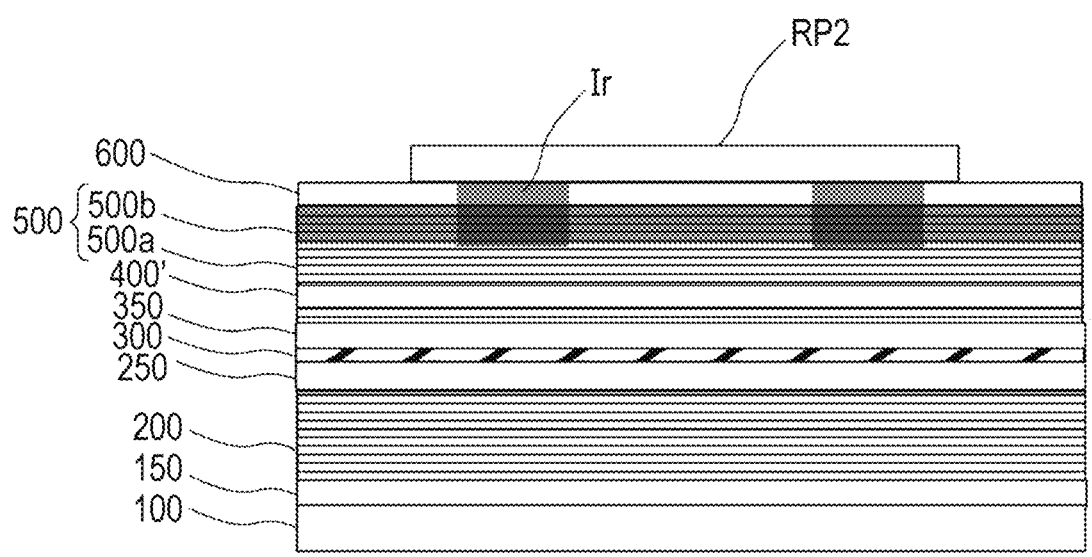
FIG. 11 is a cross-sectional view (part 8) for each step of the method for manufacturing the surface emitting laser according to the first embodiment of the present technology.
Figure 12:
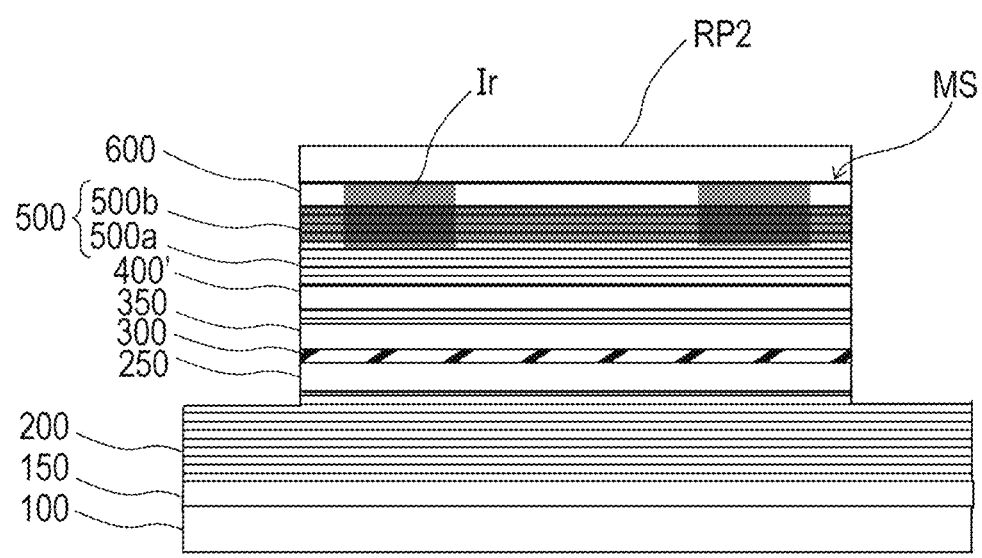
FIG. 12 is a cross-sectional view (part 9) of each step of the method for manufacturing the surface emitting laser according to the first embodiment of the present technology.
Figure 13:
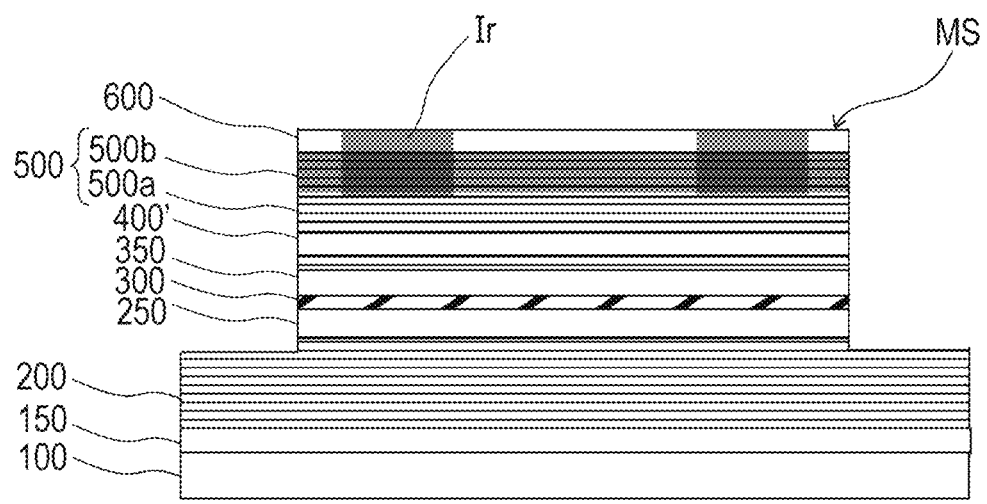
FIG. 13 is a cross-sectional view (part 10) for each step of the method for manufacturing the surface emitting laser according to the first embodiment of the present technology.

Specifically, as illustrated in FIG. 11, a resist pattern RP2 for mesa formation is formed on the contact layer 600 of the laminate in which the high-concentration impurity region Ir is formed. Next, as illustrated in FIG. 12, the laminate is selectively etched (for example, wet etched) using, for example, a sulfuric acid etchant to form a mesa structure MS. Here, etching is performed such that the etching bottom surface is located in the first multilayer film reflector 200. Thereafter, as illustrated in FIG. 13, the resist pattern RP2 is removed.

Figure 14:
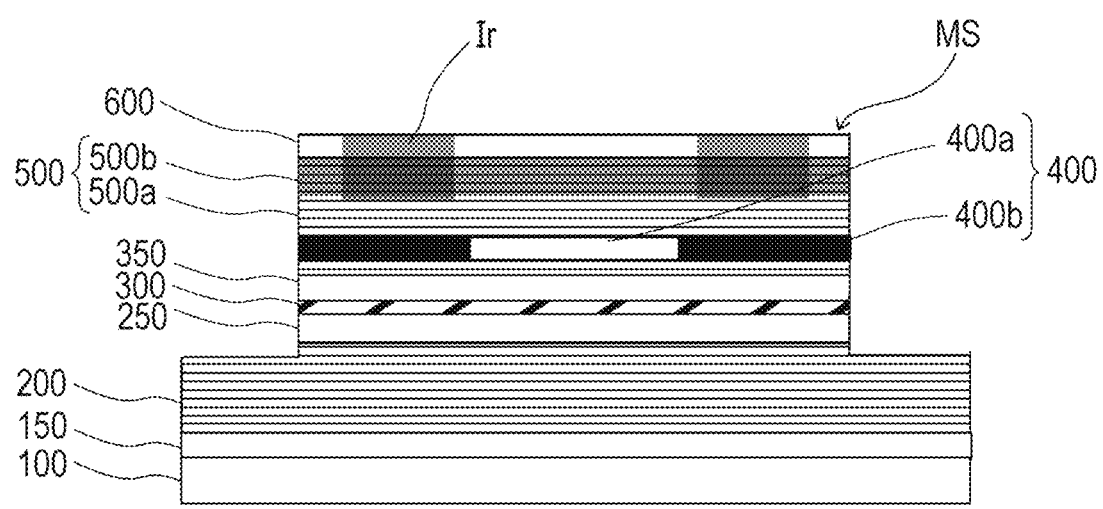
FIG. 14 is a cross-sectional view (part 11) for each step of the method for manufacturing the surface emitting laser according to the first embodiment of the present technology.

In the next step S8, as illustrated in FIG. 14, the peripheral portion of the selected oxide layer 400' (see FIG. 13) is oxidized to generate the current confinement layer 400.

Specifically, the mesa structure MS is exposed to a water vapor atmosphere, and the selected oxide layer 400' is oxidized (selectively oxidized) from the side surface to form the current confinement layer 400 in which the non-oxidized region 400a is surrounded by the oxidized region 400b.

Figure 15:
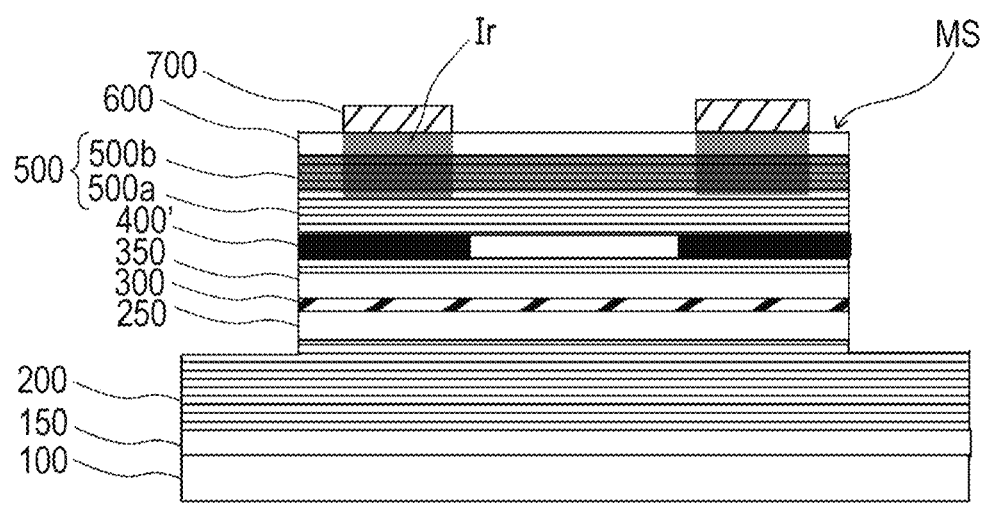
FIG. 15 is a cross-sectional view (part 12) for each step of the method for manufacturing the surface emitting laser according to the first embodiment of the present technology.

In the next step S9, as illustrated in FIG. 15, the anode electrode 700 is formed on the mesa structure MS so as to be in contact with the high-concentration impurity region Ir.

Specifically, for example, an Au/Ti film is formed on the high-concentration impurity region Ir by an EB vapor deposition method, and the resist and, for example, Au/Ti on the resist are lifted off to form the anode electrode 700 on the high-concentration impurity region Ir.

Figure 16:
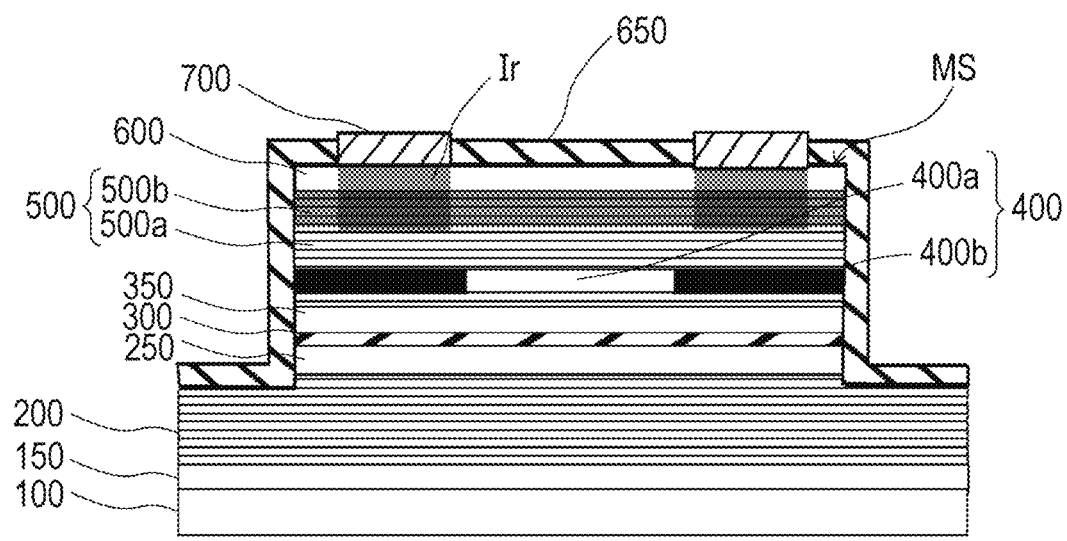
FIG. 16 is a cross-sectional view (part 13) for each step of the method for manufacturing the surface emitting laser according to the first embodiment of the present technology.

In the next step S10, as illustrated in FIG. 16, after the insulating film 650 is formed on the laminate, the insulating film 650 on the anode electrode 700 is removed by etching using, for example, a hydrofluoric acid-based etchant using a resist pattern open only on the anode electrode 700.

Figure 17:
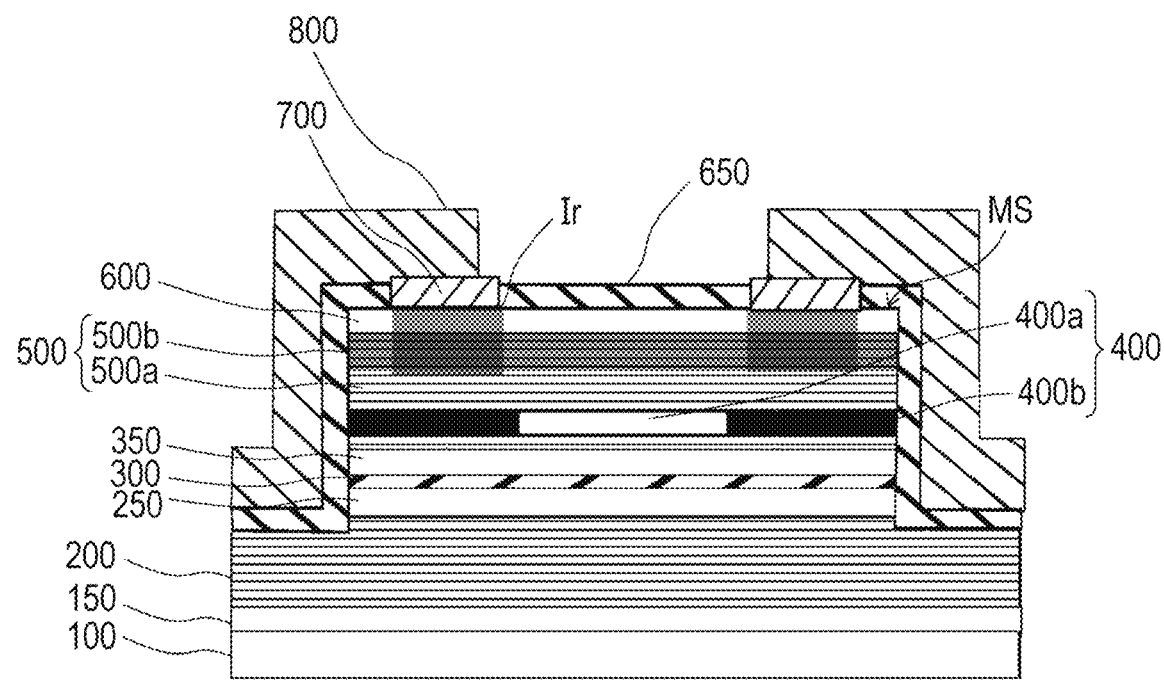
FIG. 17 is a cross-sectional view (part 14) for each step of the method for manufacturing the surface emitting laser according to the first embodiment of the present technology.

In the next step S11, as illustrated in FIG. 17, the wiring layer 800 is formed on the insulating film 650 so as to be in contact with the anode electrode 700.

Figure 18:
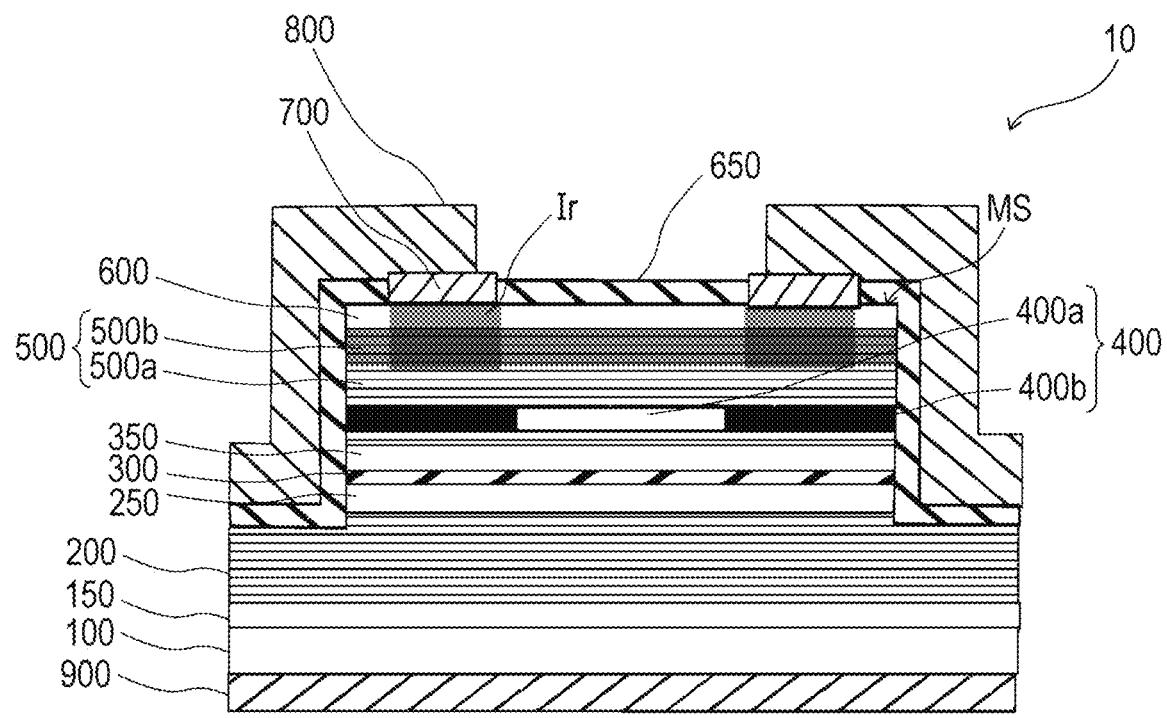
FIG. 18 is a cross-sectional view (part 15) for each step of the method for manufacturing the surface emitting laser according to the first embodiment of the present technology.

In the final step S12, as illustrated in FIG. 18, the cathode electrode 900 is formed on the back surface of the substrate 100. Thereafter, processing such as annealing, thinning by polishing the back surface of the wafer, and non-reflection coating on the back surface of the wafer is performed, and a plurality of surface emitting laser arrays in which a plurality of surface emitting lasers 10 is two-dimensionally arranged is formed on one wafer. Thereafter, the surface emitting laser arrays are separated into a plurality of surface emitting laser array chips by dicing.

(3) Action of Surface Emitting Laser According to First Embodiment of Present Technology In the surface emitting laser 10, a current is injected into the anode electrode 700 from an electrode pad disposed around the surface emitting laser array via the wiring layer 800. The current injected into the anode electrode 700 is injected into the active layer 300 via the low-resistance high-concentration impurity region Ir formed across the contact layer 600 and the second layer 500b of the second multilayer film reflector 500, the first layer 500a, the current confinement layer 400, and the second spacer layer 350. With this configuration, when the active layer 300 emits light, the light is amplified while being repeatedly reflected between the first and second multilayer film reflectors 200 and 500, and the oscillation condition is satisfied, the light is emitted as laser light from the top of the mesa structure MS.

(4) Effects of Surface Emitting Laser According to First Embodiment of Present Technology The surface emitting laser 10 according to the first embodiment includes:
a first multilayer film reflector 200;
a second multilayer film reflector 500; and
an active layer 300 disposed between the first multilayer film reflector and the second multilayer film reflector, in which the second multilayer film reflector 500 is a surface emitting laser in which a high-concentration impurity region Ir having a higher impurity concentration than other regions is partially provided in the thickness direction.

In this case, in manufacturing the surface emitting laser 10, for example, as compared with a case where the high-concentration impurity region is provided in the entire region of the second multilayer film reflector 500 in the thickness direction, in a case where impurities are injected under the same condition, the time for injecting the impurities to form the high-concentration impurity region can be shortened.

As a result, according to the surface emitting laser 10, it is possible to provide a surface emitting laser capable of reducing resistance while suppressing a decrease in manufacturing efficiency.

In addition, according to the surface emitting laser 10, since the time during which the impurities are diffused is shortened, it is possible to suppress the occurrence of defects such as surface abnormality, which contributes to suppression of quality deterioration and improvement of yield.

Furthermore, according to the surface emitting laser 10, when a current is injected from the second multilayer film reflector 500 side, since the resistance of the second multilayer film reflector 500 is reduced in the high-concentration impurity region Ir, a current can be efficiently caused to flow through the active layer 300. This enables low-voltage driving.

The high-concentration impurity region Ir is partially provided in the in-plane direction of the second multilayer film reflector 500. With this configuration, for example, the high-concentration impurity region Ir can be prevented from being formed on the optical waveguide (central portion of the laser resonator) in the surface emitting laser 10. As a result, light absorption (light loss) in the optical waveguide can be suppressed.

Specifically, the mesa structure MS is formed including at least a part of the first multilayer film reflector 200, the active layer 300, and the second multilayer film reflector 500, and the high-concentration impurity region Ir is provided in the peripheral portion of the mesa structure MS.

More specifically, the current confinement layer 400 in which the oxidized region 400b surrounds the non-oxidized region 400a is disposed in the second multilayer film reflector 500, and the high-concentration impurity region Ir is provided so as to surround the non-oxidized region 400a when viewed from the height direction of the mesa structure MS.

The difference between the outer diameter and the inner diameter of the high-concentration impurity region Ir is 1 µm or more. With this configuration, the diameter of the optical waveguide in the surface emitting laser 10 can be secured in the region where the high-concentration impurity region is not formed.

The surface emitting laser 10 further includes an anode electrode 700 in contact with the high-concentration impurity region Ir. With this configuration, contact resistance between the anode electrode 700 and the contact layer 600 can be reduced.

The high-concentration impurity region Ir is provided at least on a surface layer farther from the active layer 300 of the second multilayer film reflector 500. With this configuration, for example, when current is injected from the second multilayer film reflector 500 side, at least the contact resistance at the time of current injection can be reduced.

The high-concentration impurity region Ir is not provided at least on a surface layer closer to the active layer 300 of the second multilayer film reflector 500. With this configuration, it is possible to suppress the inflow of impurities into the active layer 300, and it is possible to suppress the generation of defects and the generation of free carriers due to the excess dopant.

The second multilayer film reflector 500 includes a first layer 500a and a second layer 500b provided with the high-concentration impurity region Ir.

The first layer 500a is relatively closer to the active layer 300 and the second layer 500b is relatively farther from the active layer 300. With this configuration, it is possible to suppress the inflow of impurities into the active layer 300, and it is possible to suppress the generation of defects and the generation of free carriers due to the excess dopant.

The high-concentration impurity region Ir is provided in the entire region of the second layer 500b in the thickness direction. This makes it possible to reduce the resistance as much as possible while suppressing an increase in the time required for diffusion of impurities.

The high-concentration impurity region Ir is not provided in the first layer 500a. With this configuration, it is possible to suppress an increase in time required for diffusion of impurities, and it is possible to suppress inflow of impurities into the active layer.

The optical thickness of the second layer 500b is thinner than the optical thickness of the first layer 500a. With this configuration, in manufacturing the surface emitting laser 10, the time for injecting the impurity can be sufficiently shortened as compared with the case where the high-concentration impurity region is formed in the entire region of the second multilayer film reflector 500 in the thickness direction.

The first layer 500a has one or more pairs of refractive index layers, at least one of which contains Al in a composition, the second layer 500b has one or more pairs of refractive index layers, at least one of which contains Al in a composition, and a ratio of an optical thickness of a refractive index layer having a higher Al composition to an optical thickness of a refractive index layer having a lower Al composition in the pairs of the second layer 500b is larger than a ratio of an optical thickness of a refractive index layer having a higher Al composition to an optical thickness of a refractive index layer having a lower Al composition in the pairs of the first layer 500a.

With this configuration, when the high-concentration impurity region Ir is formed at the time of manufacturing the surface emitting laser 10, diffusion of impurities can be promoted, and the manufacturing efficiency can be further improved.

The sum of the optical thicknesses of the refractive index layers constituting the pairs of the first layer 500a and the sum of the optical thicknesses of the refractive index layers constituting the pairs of the second layer 500b are substantially the same. This makes it possible to promote diffusion of impurities while suppressing an increase in the optical thickness of the second layer 500b.

Incidentally, the high-concentration impurity region Ir is formed by injecting and diffusing impurities into the second multilayer film reflector 500. At this time, as the Al composition of each refractive index layer of the second multilayer film reflector 500 is higher, diffusion of impurities is promoted. If the diffusion of impurities is promoted, the high-concentration impurity region Ir can be formed in a shorter time.

Here, in a case where only the diffusivity of impurities is considered, it is sufficient if the Al compositions of the high refractive index layer and the low refractive index layer constituting the pair are uniformly increased, but in this case, the refractive index difference between the high refractive index layer and the low refractive index layer becomes small. If the refractive index difference between the high refractive index layer and the low refractive index layer becomes small, the reflectance decreases. Therefore, it is necessary to increase the number of pairs in order to obtain a desired reflectance. However, an increase in the number of pairs (an increase in the optical thickness of the second multilayer film reflector 500) leads to an increase in series resistance.

Therefore, under the condition that the Al composition of each refractive index layer of the pairs and the sum of the optical thicknesses of the refractive index layers constituting the pairs are constant, in the pairs, by increasing the ratio of the optical thickness of the refractive index layer having a high Al composition to the optical thickness of the refractive index layer having a low Al composition, diffusion of impurities can be promoted while suppressing an increase in series resistance and a decrease in reflectance.

Meanwhile, as the oscillation wavelength $\lambda$ of the surface emitting laser 10 is longer, the second multilayer film reflector in which the high refractive index layer and the low refractive index layer are alternately formed with an optical thickness of $\lambda/4$ also becomes thicker, and thus the time required for diffusion of impurities for forming the high-concentration impurity region Ir becomes longer.

Therefore, in a case where the oscillation wavelength $\lambda$ of the surface emitting laser 10 is on the long wavelength side, for example, in a case where the oscillation wavelength $\lambda$ is 900 nm or more, a layer configuration including the first and second layers 500a and 500b of the second multilayer film reflector 500 is particularly effective.

The high-concentration impurity region Ir includes a protrusion Ir2 protruding from the second layer 500b to the side opposite to the first layer 500a side. The contact layer 600 is disposed on the side opposite to the active layer 300 side with respect to the second multilayer film reflector 500, and at least a part of the protrusion Ir2 is disposed in the contact layer 600. With this configuration, the resistance of the region of the contact layer 600 in contact with the anode electrode 700 can be reduced.

According to the surface emitting laser array in which the surface emitting lasers 10 are two-dimensionally arranged, since the resistance of each of the surface emitting lasers 10 is reduced, it is possible to provide a surface emitting laser array with low power consumption.

A method for manufacturing a surface emitting laser 10 according to the first embodiment of the present technology is a method for manufacturing a surface emitting laser, the method including:

a step of generating a laminate 5000 by laminating at least a first multilayer film reflector, an active layer, and a second multilayer film reflector in this order;

a step of forming an insulating film 650 on a side opposite to the active layer 300 side with respect to the second multilayer film reflector 500 of the laminate 5000; a step of etching the insulating film 650 to form an opening OP; and a step of diffusing impurities into a part of a layer including a surface layer farther from the active layer 300 of the second multilayer film reflector 500 via the opening OP.

In this case, in manufacturing the surface emitting laser 10, for example, as compared with a case where the high-concentration impurity region is provided in the entire region of the second multilayer film reflector 500 in the thickness direction, the time for injecting and diffusing the impurities to form the high-concentration impurity region Ir can be shortened.

As a result, with the method for manufacturing the surface emitting laser 10 according to the first embodiment, it is possible to manufacture the surface emitting laser capable of reducing the resistance while suppressing a decrease in manufacturing efficiency.

In the step of diffusing the impurities, the impurities are not diffused at least into a surface layer relatively closer to the active layer 300 of the second multilayer film reflector 500. With this configuration, it is possible to suppress the inflow of impurities into the active layer 300, and it is possible to suppress the generation of defects and the generation of free carriers due to the excess dopant.

In the step of generating the laminate 5000, the contact layer 600 is further laminated on the side opposite to the active layer 300 side with respect to the second multilayer film reflector 500, and in the step of diffusing the impurities, the impurities are diffused into a part of a layer including the contact layer 600 and the surface layer farther from the active layer 300 of the second multilayer film reflector 500.

Hereinafter, modifications of the surface emitting laser according to the first embodiment of the present technology and a surface emitting laser of other embodiments will be described. In the following modifications and other embodiments, differences from the first embodiment will be mainly described.

Meanwhile, the position of the bottom surface of the high-concentration impurity region, that is, the thickness of the high-concentration impurity region can be adjusted by adjusting the injection speed, the injection amount, and the injection time of the impurities when the high-concentration impurity region is formed at the time of manufacturing the surface emitting laser.

2. <Surface Emitting Laser According to Modification 1 of First Embodiment of Present Technology>

Figure 19:
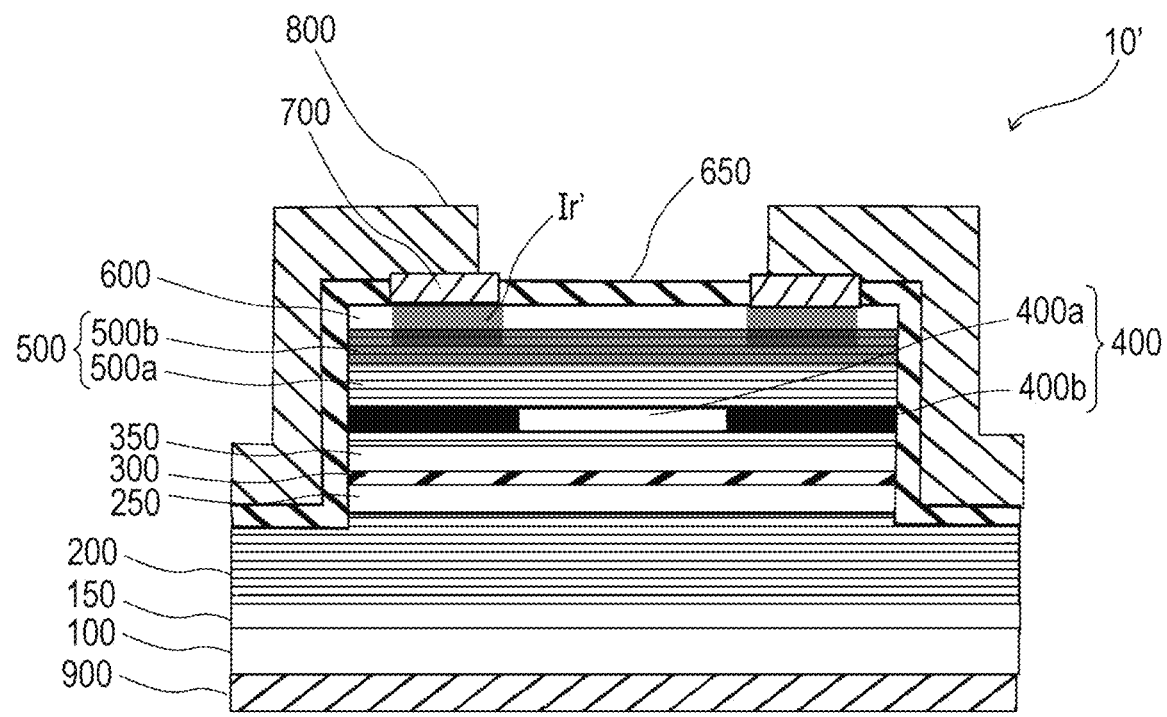
FIG. 19 is a cross-sectional view illustrating a configuration of a surface emitting laser according to Modification 1 of the first embodiment of the present technology.

FIG. 19 is a cross-sectional view illustrating a configuration of a surface emitting laser 10' according to Modification 1.

In the surface emitting laser 10' according to Modification 1, as illustrated in FIG. 19, a high-concentration impurity region Ir' is provided only in a part (for example, an upper portion) of the second layer 500b of the second multilayer film reflector 500.

The surface emitting laser 10' according to Modification 1 is inferior to reduction in resistance but is excellent in manufacturing efficiency as compared with the surface emitting laser 10 according to the first embodiment.

3. <Surface Emitting Laser According to Modification 2 of First Embodiment of Present Technology>

Figure 20:
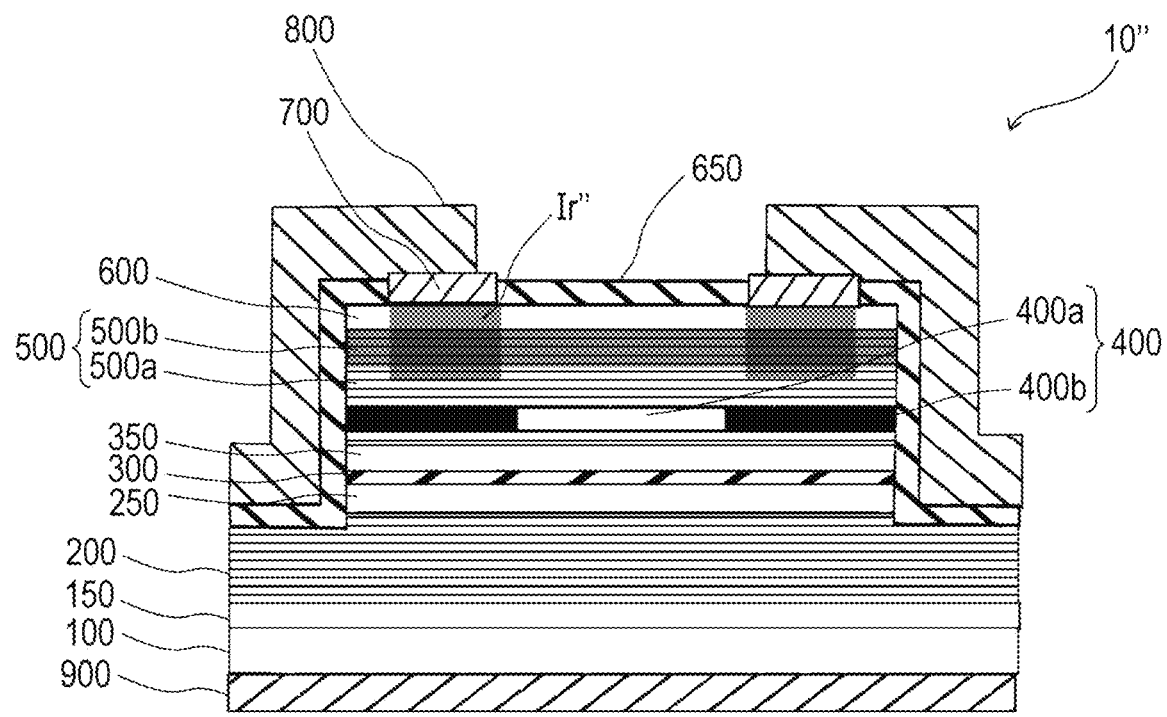
FIG. 20 is a cross-sectional view illustrating a configuration of a surface emitting laser according to Modification 2 of the first embodiment of the present technology.

FIG. 20 is a cross-sectional view illustrating a configuration of a surface emitting laser 10" according to Modification 2.

In the surface emitting laser 10" according to Modification 2, as illustrated in FIG. 20, a high-concentration impurity region Ir" is provided in the entire region of the second layer 500b of the second multilayer film reflector 500 in the thickness direction and only in a part (for example, an upper portion) of the first layer 500a.

The surface emitting laser 10" according to Modification 2 is inferior in manufacturing efficiency but is excellent in reduction in resistance as compared with the surface emitting laser 10 according to the first embodiment.

4. <Surface Emitting Laser According to Second Embodiment of Present Technology>

Figure 21:
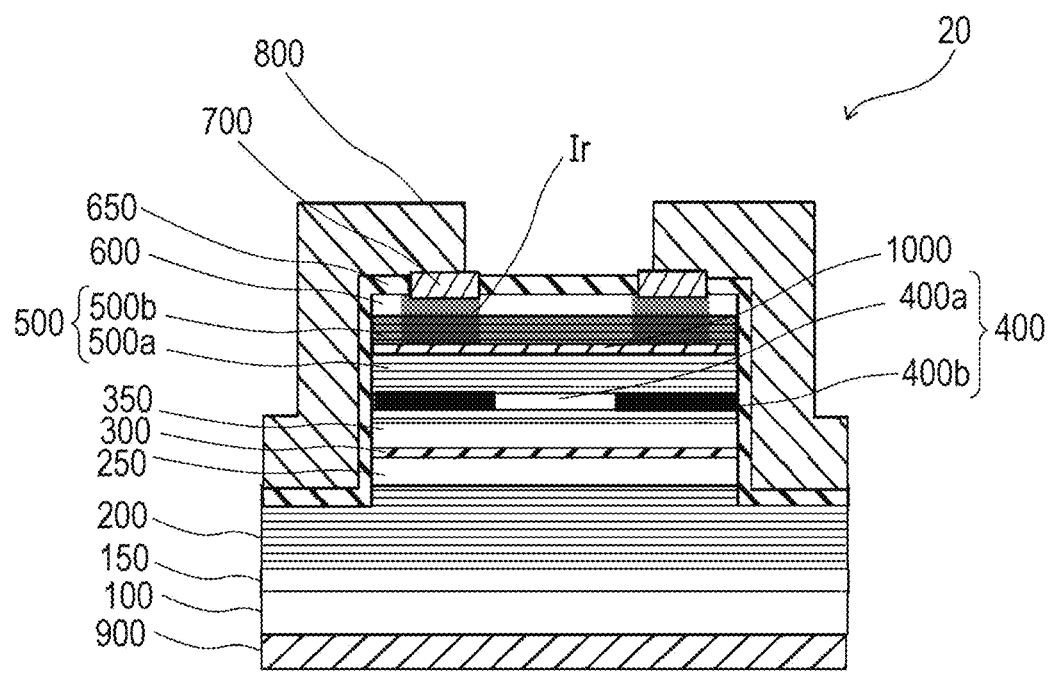
FIG. 21 is a cross-sectional view illustrating a configuration of a surface emitting laser according to a second embodiment of the present technology.

FIG. 21 is a cross-sectional view illustrating a configuration of a surface emitting laser 20 according to a second embodiment.

In the surface emitting laser 20 according to the second embodiment of the present technology, as illustrated in FIG. 21, one or more pairs of undoped or lightly doped refractive index layers or undoped or lightly doped GaAs layers as a diffusion suppression layer 1000 are disposed between the second layer 500b and the active layer 300. The refractive index layer includes, for example, an AlGaAs-based compound semiconductor, an AlGaInP-based compound semiconductor, an AlGaN-based compound semiconductor, or the like.

The diffusion suppression layer 1000 is disposed, for example, between the second layer 500b and the first layer 500a.

The diffusion suppression layer 1000 functions as a layer that suppresses diffusion of impurities when the high-concentration impurity region Ir is formed at the time of manufacturing the surface emitting laser 20.

In a case where one or more pairs of undoped or lightly doped refractive index layers are used for the diffusion suppression layer 1000, the refractive index layer having a higher Al composition in the pairs preferably has a lower Al composition than the refractive index layer having a higher Al composition in the pairs of the second layer 500b.

In a case where one or more pairs of undoped or lightly doped refractive index layers are used for the diffusion suppression layer 1000, the refractive index layer having a higher Al composition in the pairs preferably has a lower Al composition than the refractive index layer having a higher Al composition in the pairs of the first layer 500a.

In a case where one or more pairs of undoped or lightly doped refractive index layers are used for the diffusion suppression layer 1000, the refractive index layer having a lower Al composition in the pairs preferably has a lower Al composition than the refractive index layer having a lower Al composition in the pairs of the second layer 500b.

In a case where one or more pairs of undoped or lightly doped refractive index layers are used for the diffusion suppression layer 1000, the refractive index layer having a lower Al composition in the pairs preferably has a lower Al composition than the refractive index layer having a lower Al composition in the pairs of the first layer 500b.

In a case where one or more pairs of undoped or lightly doped refractive index layers are used for the diffusion suppression layer 1000, the ratio of the optical thickness of the refractive index layer having a higher Al composition to the optical thickness of the refractive index layer having a lower Al composition in the pairs is preferably lower than the ratio of the optical thickness of the refractive index layer having a higher Al composition to the optical thickness of the refractive index layer having a lower Al composition in the pairs of the second layer 500b.

In a case where one or more pairs of lightly doped refractive index layers are used for the diffusion suppression layer 1000, the doping concentration of the refractive index layer is preferably $1 \times 10^{18}$ cm$^{-3}$ or less.

In a case where a lightly doped GaAs layer is used for the diffusion suppression layer, the doping concentration of the GaAs is preferably $1 \times 10^{18}$ cm$^{-3}$ or less.

In addition to the diffusion suppression function, the diffusion suppression layer 1000 may have a standing wave adjusting function to be described later.

Hereinafter, a laminate generation step in a method for manufacturing the surface emitting laser 20 according to the second embodiment will be described with reference to the flowchart of FIG. 22. In the laminate generation step, a chemical vapor deposition (CVD) method, for example, a metal organic chemical vapor deposition (MOCVD) method is used.

Figure 22:
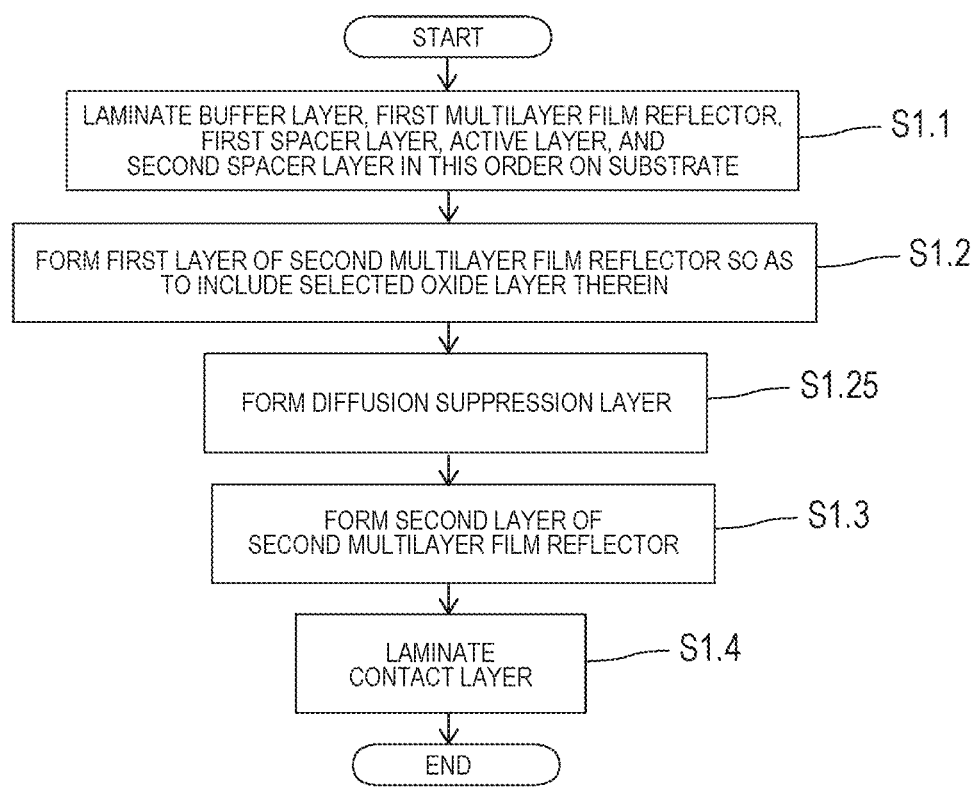
FIG. 22 is a flowchart for describing a laminate generation step in a method for manufacturing the surface emitting laser according to the second embodiment of the present technology.

In the laminate generation step, steps S1.1 to S1.4 shown in FIG. 22 are executed.

In the first step S1.1, the buffer layer 150, the first multilayer film reflector 200, the first spacer layer 250, the active layer 300, and the second spacer layer 350 are laminated in this order on the substrate 100.

In the next step S1.2, the first layer 500a of the second multilayer film reflector 500 is formed so as to include the selected oxide layer 400' therein.

In the next step S1.25, the diffusion suppression layer 1000 is formed on the first layer 500a.

In the next step S1.3, the second layer 500b of the second multilayer film reflector 500 is formed on the diffusion suppression layer 1000.

In the final step S1.4, the contact layer 600 is laminated on the second multilayer film reflector 500b.

With the surface emitting laser 20 according to the second embodiment, since the diffusion suppression layer 1000 is disposed between the second layer 500b and the active layer 300, it is possible to suppress the inflow of impurities into the active layer 300 when the impurities are injected into the second layer 500b at the time of forming the high-concentration impurity region Ir. Since inflow of impurities into the active layer 300 is suppressed by the diffusion suppression layer 1000, precise control of the injection amount, injection speed, injection time, and the like is not required at the time of impurity injection.

Furthermore, with the surface emitting laser 20 according to the second embodiment, for example, since the diffusion suppression layer 1000 is disposed between the first layer 500a and the second layer 500b, it is possible to suppress diffusion of impurities into the first layer 500a when the impurities are injected into the second layer 500b at the time of forming the high-concentration impurity region Ir. With this configuration, the inflow of impurities into the active layer 300 can be more reliably suppressed.

In the laminate generation step (step of generating the laminate), the diffusion suppression layer 1000 that suppresses diffusion of the impurities is laminated on the active layer 300 before all of the second multilayer film reflector 500 is laminated on the active layer 300. With this configuration, the inflow of impurities into the active layer 300 can be more reliably suppressed.

Note that, in the surface emitting laser 20 according to the second embodiment, the diffusion suppression layer 1000 is disposed between the first layer 500a and the second layer 500b, but the present technology is not limited thereto, and for example, the diffusion suppression layer may be disposed in the first layer 500a or the second layer 500b.

5. <Surface Emitting Laser According to Third Embodiment of Present Technology>

Figure 23:
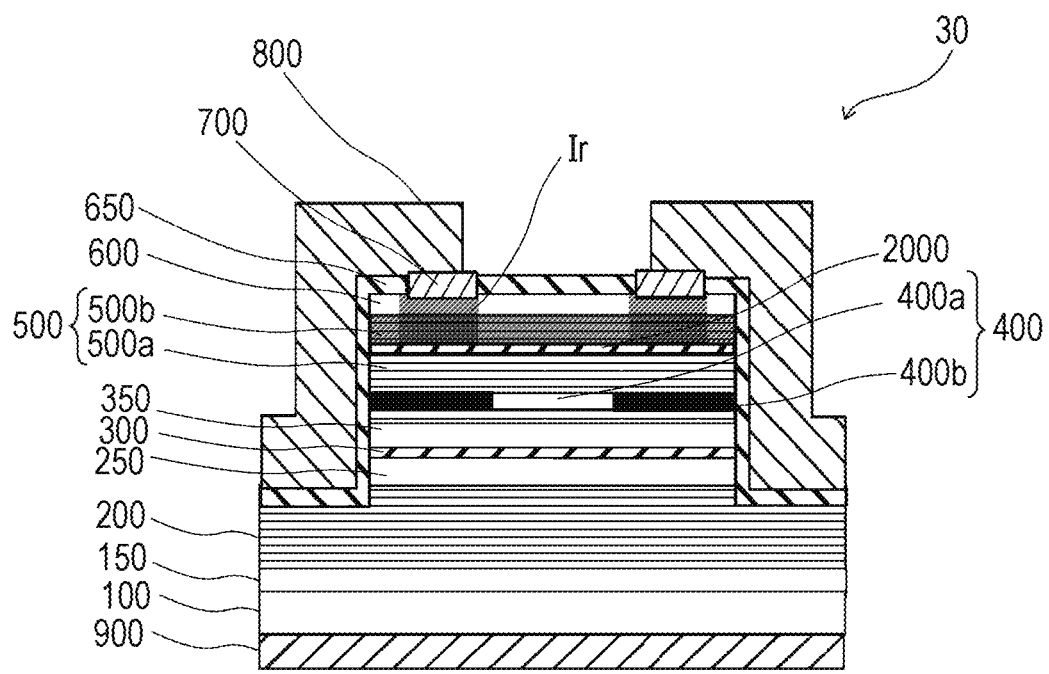
FIG. 23 is a cross-sectional view illustrating a configuration of a surface emitting laser according to a third embodiment of the present technology.

FIG. 23 is a cross-sectional view illustrating a configuration of a surface emitting laser 30 according to a third embodiment.

The surface emitting laser 30 according to the third embodiment includes a standing wave adjustment layer 2000 disposed between the first layer 500a and the second layer 500b in the second multilayer film reflector 500.

The standing wave adjustment layer 2000 includes, for example, one or more pairs of undoped or lightly doped refractive index layers. The refractive index layer is, for example, a layer containing Al in a composition, and includes, for example, an AlGaAs-based compound semiconductor, an AlGaInP-based compound semiconductor, an AlGaN-based compound semiconductor, or the like.

Figure 29:
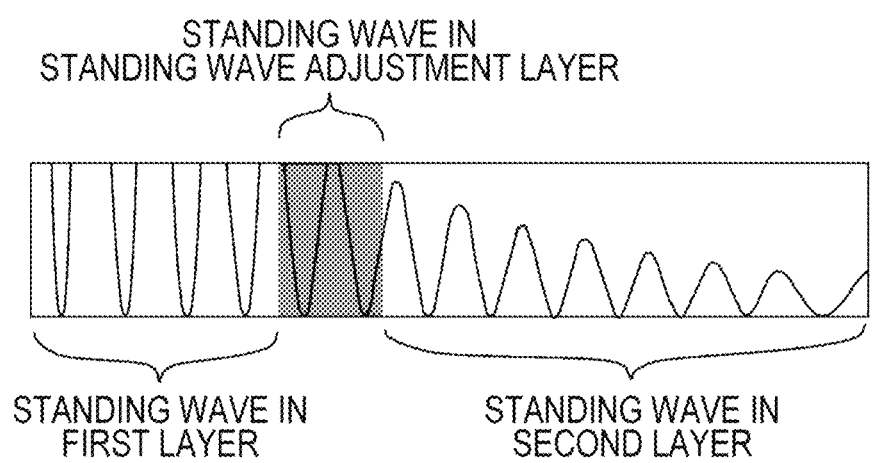
FIG. 29 is a diagram for describing a function of a standing wave adjustment layer.

Meanwhile, for example, as illustrated in FIG. 29, due to the difference in the ratio (film thickness ratio) of the optical thicknesses of the refractive index layers in the pair between the first layer 500a and the second layer 500b, a deviation occurs between the standing wave in the first layer 500a and the standing wave in the second layer.

The standing wave adjustment layer 2000 has a function of suppressing the deviation between the standing waves.

For example, an optical thickness of each refractive index layer in pairs of the standing wave adjustment layer 2000 is preferably an optical thickness between the optical thickness of the corresponding refractive index layer of the first layer 500a and the optical thickness of the corresponding refractive index layer of the second layer 500b.

For example, an optical thickness of a refractive index layer having a higher Al composition in the pairs of the standing wave adjustment layer 2000 is preferably thicker than the optical thickness of the refractive index layer having a higher Al composition in the pairs of the first layer 500a, and is preferably thinner than the optical thickness of the refractive index layer having a higher Al composition in the pairs of the second layer 500b.

For example, an optical thickness of a refractive index layer having a lower Al composition in the pairs of the standing wave adjustment layer 2000 is preferably thicker than the optical thickness of the refractive index layer having a lower Al composition in the pairs of the first layer 500a, and is preferably thinner than the optical thickness of the refractive index layer having a lower Al composition in the pairs of the second layer 500b.

In a case where one or more pairs of lightly doped refractive index layers are used for the standing wave adjustment layer 2000, the doping concentration of the refractive index layer is preferably equal to or less than the doping concentration of, for example, a p-type or n-type compound semiconductor constituting a region other than the high-concentration impurity region of the second multilayer film reflector 500.

The standing wave adjustment layer 2000 can also have an impurity diffusion suppression function by introducing the elements of the diffusion suppression layer 1000 described above.

Hereinafter, a laminate generation step in a method for manufacturing the surface emitting laser 30 according to the third embodiment will be described with reference to the flowchart of FIG. 24. In the laminate generation step, a chemical vapor deposition (CVD) method, for example, a metal organic chemical vapor deposition (MOCVD) method is used.

Figure 24:
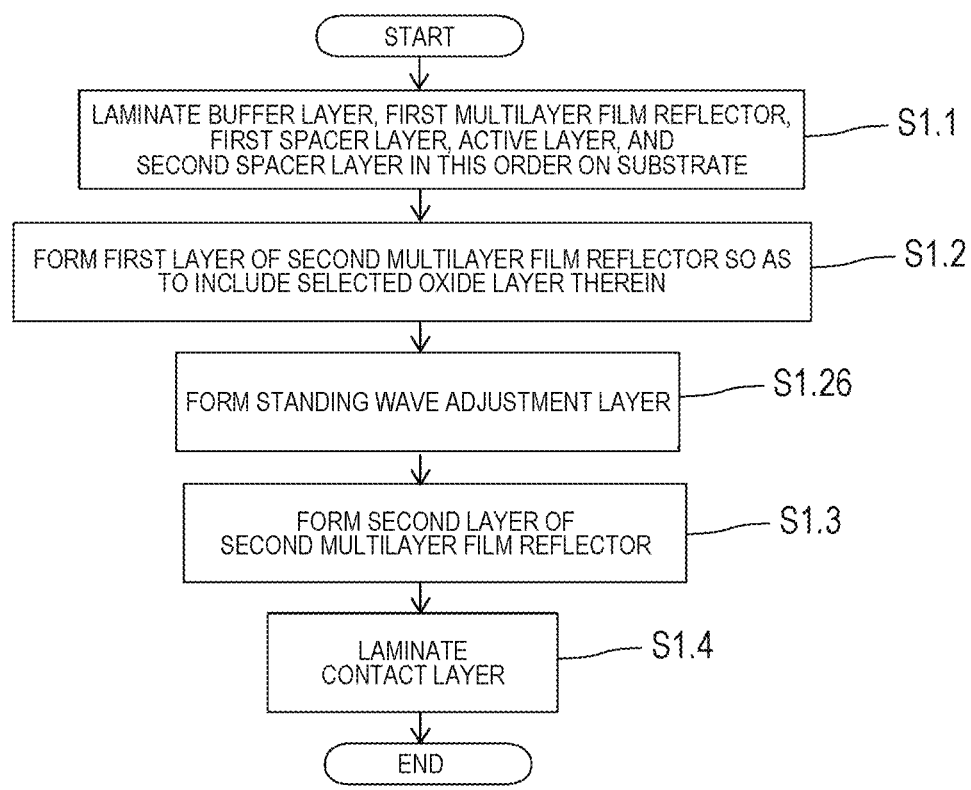
FIG. 24 is a flowchart for describing a laminate generation step in a method for manufacturing the surface emitting laser according to the third embodiment of the present technology.

In the laminate generation step, steps S1.1 to S1.4 shown in FIG. 24 are executed.

In the first step S1.1, the buffer layer 150, the first multilayer film reflector 200, the first spacer layer 250, the active layer 300, and the second spacer layer 350 are laminated in this order on the substrate 100.

In the next step S1.2, the first layer 500*a* of the second multilayer film reflector 500 is formed so as to include the selected oxide layer 400' therein.

In the next step S1.26, the standing wave adjustment layer 2000 is formed on the first layer 500*a*.

In the next step S1.3, the second layer 500*b* of the second multilayer film reflector 500 is formed on the standing wave adjustment layer 2000.

In the final step S1.4, the contact layer 600 is laminated on the second layer 500*b*.

With the surface emitting laser 30 according to the third embodiment, since the standing wave adjustment layer 2000 is provided between the first layer 500*a* and the second layer 500*b*, it is possible to adjust the deviation between the standing waves due to the difference in the ratio (film thickness ratio) of the optical thicknesses of the pair of refractive index layers between the first layer 500*a* and the second layer 500*b*.

In the method for manufacturing the surface emitting laser 30 according to the third embodiment, the ratio of the optical thickness of the refractive index layer having a higher Al composition to the optical thickness of the refractive index layer having a lower Al composition in the pairs of the second layer 500*b* is larger than the ratio of the optical thickness of the refractive index layer having a higher Al composition to the optical thickness of the refractive index layer having a lower Al composition in the pairs of the first layer 500*a*, and in the step of generating the laminate 5000, the first layer 500*a* is laminated on the active layer 300, the standing wave adjustment layer 2000 is laminated on the first layer 500*a*, and the second layer 500*b* is laminated on the standing wave adjustment layer 2000.

6. <Surface Emitting Laser According to Fourth Embodiment of Present Technology>

Figure 25:
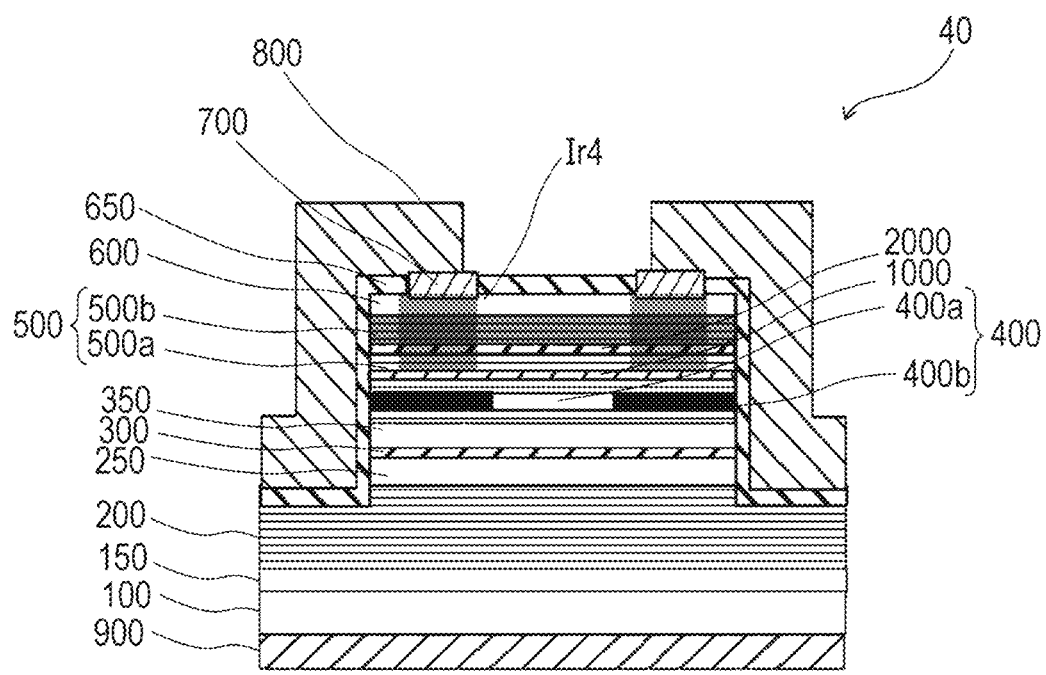
FIG. 25 is a cross-sectional view illustrating a configuration of a surface emitting laser according to a fourth embodiment of the present technology.

FIG. 25 is a cross-sectional view illustrating a configuration of a surface emitting laser 40 according to a fourth embodiment.

As illustrated in FIG. 25, the surface emitting laser 40 according to the fourth embodiment is provided with the diffusion suppression layer 1000 and the standing wave adjustment layer 2000 in the second multilayer film reflector 500.

Specifically, in the second multilayer film reflector 500, the diffusion suppression layer 1000 is disposed in the first layer 500*a*, and the standing wave adjustment layer 2000 is disposed between the first layer 500*a* and the second layer 500*b*.

More specifically, the standing wave adjustment layer 2000 is disposed between the first layer 500*a* and the second layer 500*b*, and the diffusion suppression layer 1000 is disposed at a position between the current confinement layer 400 and the standing wave adjustment layer 2000 in the first layer 500*a*.

Here, the standing wave adjustment layer 2000 does not have the above-described diffusion suppression function, and impurities flow into the first layer 500*a*.

That is, in the surface emitting laser 40, for example, a high-concentration impurity region Ir4 is provided across between the first layer 500*a* and the second layer 500*b*. The bottom surface of the high-concentration impurity region Ir4 is located on the diffusion suppression layer 1000.

Hereinafter, a laminate generation step in a method for manufacturing the surface emitting laser 40 according to the fourth embodiment will be described with reference to the flowchart of FIG. 26. In the laminate generation step, a chemical vapor deposition (CVD) method, for example, a metal organic chemical vapor deposition (MOCVD) method is used.

Figure 26:
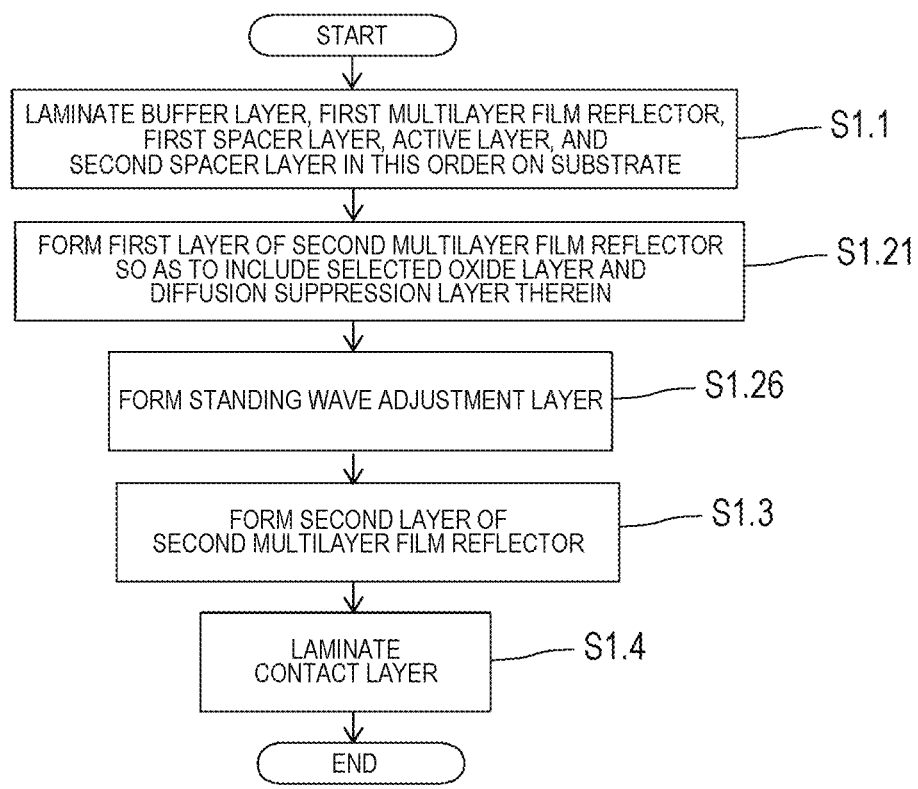
FIG. 26 is a flowchart for describing a laminate generation step in a method for manufacturing the surface emitting laser according to the fourth embodiment of the present technology.

In the laminate generation step, steps S1.1 to S1.4 shown in FIG. 26 are executed.

In the first step S1.1, the buffer layer 150, the first multilayer film reflector 200, the first spacer layer 250, the active layer 300, and the second spacer layer 350 are laminated in this order on the substrate 100.

In the next step S1.21, the first layer 500*a* of the second multilayer film reflector 500 is formed so as to include the selected oxide layer 400' and the diffusion suppression layer 1000 therein.

In the next step S1.26, the standing wave adjustment layer 2000 is formed on the first layer 500*a*.

In the next step S1.3, the second layer 500*b* of the second multilayer film reflector 500 is formed on the standing wave adjustment layer 2000.

In the final step S1.4, the contact layer 600 is laminated on the second layer 500*b*.

With the surface emitting laser 40 according to the fourth embodiment, it is possible to suppress the deviation between the standing waves due to the difference in the ratio (film thickness ratio) of the optical thicknesses of the pair between the first and second layers 500*a* and 500*b*, and it is inferior in manufacturing efficiency but excellent in low resistance and diffusion controllability as compared with the third embodiment.

7. <Surface Emitting Laser According to Fifth Embodiment of Present Technology>

Figure 27:
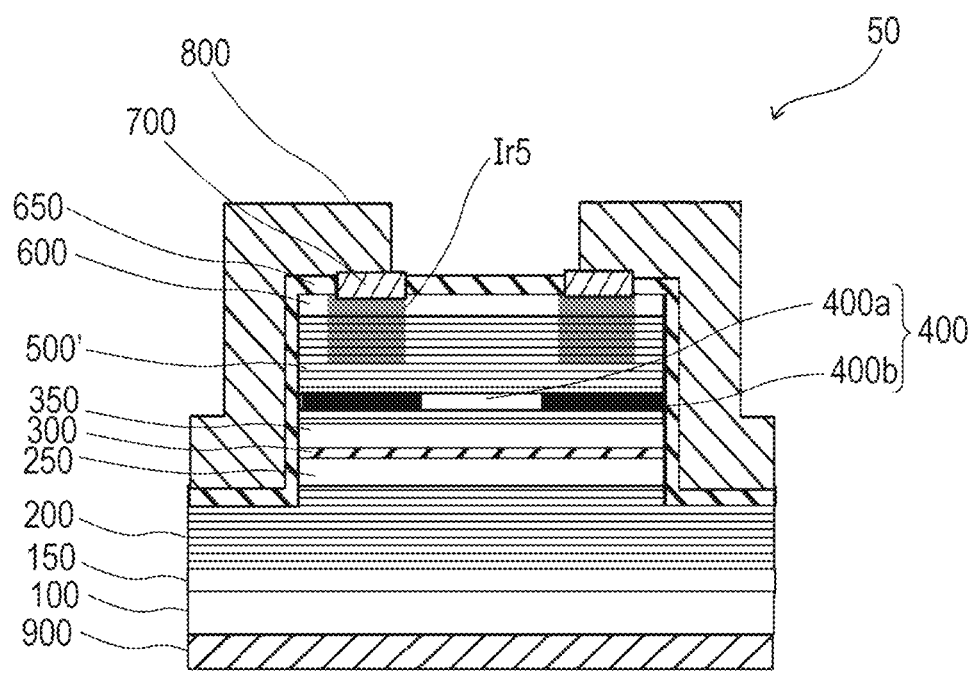
FIG. 27 is a cross-sectional view illustrating a configuration of a surface emitting laser according to a fifth embodiment of the present technology.

FIG. 27 is a cross-sectional view illustrating a configuration of a surface emitting laser 50 according to a fifth embodiment.

In the surface emitting laser 50 according to the fifth embodiment, as illustrated in FIG. 27, a ratio of optical thicknesses of refractive index layers of pairs of a second multilayer film reflector 500' is the same between the pairs.

Therefore, in the second multilayer film reflector 500', there is no distinction between the first and second layers as in each of the above embodiments and modifications.

Even in this case, it is possible to partially form a high-concentration impurity region Ir5 in the second multilayer film reflector 500' as illustrated in FIG. 27 by controlling the Al composition, the ratio of the optical thicknesses, the injection amount, the injection speed, and the injection time of the impurities, and the like of each refractive index layer of the pairs of the second multilayer film reflector 500'.

8. <Surface Emitting Laser According to Sixth Embodiment of Present Technology>

Figure 28:
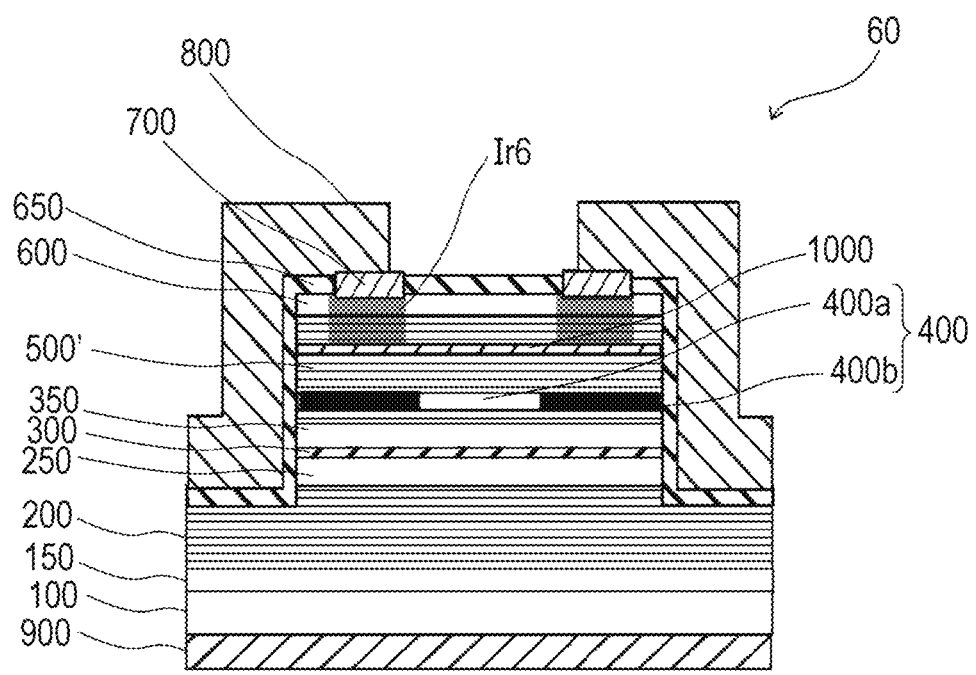
FIG. 28 is a cross-sectional view illustrating a configuration of a surface emitting laser according to a sixth embodiment of the present technology.

FIG. 28 is a cross-sectional view illustrating a configuration of a surface emitting laser 60 according to a sixth embodiment.

As illustrated in FIG. 28, the surface emitting laser 60 according to the sixth embodiment includes a second multilayer film reflector 500' having the similar configuration as that of the fifth embodiment, and includes a diffusion suppression layer 1000 in the second multilayer film reflector 500'.

More specifically, the diffusion suppression layer 1000 is disposed between the contact layer 600 and the current confinement layer 400 in the second multilayer film reflector 500'.

With the surface emitting laser 60 according to the sixth embodiment, diffusion of impurities can be suppressed in the diffusion suppression layer 1000 at the time of forming a high-concentration impurity region Ir6, and thus, as compared with the fifth embodiment, it is necessary to form the diffusion suppression layer 1000, but the degree of freedom in designing (for example, Al composition, film thickness ratio, and the like) the pairs of the second multilayer film reflector 500' can be improved, and the control at the time of impurity injection is simple.

9. <Modification of Present Technology>

The present technology is not limited to each of the above-described embodiments and modifications, and various modifications can be made.

In each of the above-described embodiments and modifications, the high-concentration impurity region is provided in the second multilayer film reflector on the current path between the anode electrode 700 and the active layer 300, but instead of this, for example, the high-concentration impurity region may be provided in the first multilayer film reflector on the current path between the cathode electrode 900 and the active layer 300. Also in this case, the effects similar to those of each of the above-described embodiments and modifications can be obtained.

In each of the above-described embodiments and modifications, the high-concentration impurity region is provided in the second multilayer film reflector on the current path between the anode electrode 700 and the active layer 300, but in addition to this, for example, the high-concentration impurity region may be provided in the first multilayer film reflector on the current path between the cathode electrode 900 and the active layer 300. Even in this case, the current path between the anode electrode 700 and the cathode electrode 900 is further reduced in resistance although the manufacturing efficiency is inferior as compared with each of the above-described embodiments and modifications, so that the current can be more efficiently injected into the active layer 300, and further reduction in power consumption can be achieved.

In the surface emitting lasers according to each of the above-described embodiments and modifications, an AlGaAs-based compound semiconductor is mainly used as the material, but the present technology is not limited thereto, and for example, another compound semiconductor such as an AlGaInP-based compound semiconductor or an AlGaN-based compound semiconductor may be used as the material.

Although it has been described that the surface emitting lasers according to each of the above-described embodiments and modifications are particularly effective for a long-wavelength surface emitting laser having an oscillation wavelength of 900 nm or more, of course, the present technology is also applicable to a medium-wavelength surface emitting laser and a short-wavelength surface emitting laser having an oscillation wavelength of less than 900 nm, and is effective.

In each of the above-described embodiments and modifications, both the first and second multilayer film reflectors 200 and 500 are semiconductor multilayer film reflectors, but the present technology is not limited thereto.

For example, the first multilayer film reflector 200 may be a semiconductor multilayer film reflector, and the second multilayer film reflector 500 may be a dielectric multilayer film reflector. The dielectric multilayer film reflector is also a kind of distributed Bragg reflector.

For example, the first multilayer film reflector 200 may be a dielectric multilayer film reflector, and the second multilayer film reflector 500 may be a semiconductor multilayer film reflector.

For example, both the first and second multilayer film reflectors 200 and 500 may be dielectric multilayer film reflectors.

The semiconductor multilayer film reflector has low light absorption and conductivity. From this viewpoint, the semiconductor multilayer film reflector is suitable for the second multilayer film reflector 500 on the emission side and on the current path from the anode electrode 700 to the active layer 300.

On the other hand, the dielectric multilayer film reflector has extremely low light absorption. From this viewpoint, the dielectric multilayer film reflector is suitable for the second multilayer film reflector 500 on the emission side.

In each of the above-described embodiments and modifications, the surface emitting laser (front surface emitting type surface emitting laser) that emits laser light from the top of the mesa structure MS has been described as an example, but the present technology is also applicable to a back surface emitting type surface emitting laser that emits the laser light from the back surface side of the substrate.

In this case, it is necessary to use a substrate that is transparent or translucent to the wavelength (oscillation wavelength) of the emitted light as the substrate or to provide an emission window that emits light to the substrate.

In the surface emitting laser according to the present technology, the first and second spacer layers 250 and 350 are not necessarily provided.

In the surface emitting laser according to the present technology, the current confinement layer 400 may be disposed inside the first multilayer film reflector 500.

In the surface emitting laser according to the present technology, the current confinement layer 400 is not necessarily provided.

In the surface emitting laser according to the present technology, the buffer layer 150 is not necessarily provided.

In the surface emitting laser according to the present technology, the contact layer 600 is not necessarily provided.

In each of the above-described embodiments and modifications, the surface emitting laser array in which the surface emitting lasers 10 are two-dimensionally arranged has been described as an example, but the present technology is not limited thereto. The present technology is also applicable to a surface emitting laser array in which the surface emitting lasers 10 are one-dimensionally arranged, a single surface emitting laser 10, and the like.

10. <Example of Use of Surface Emitting Laser to which Present Technology is Applied>

The surface emitting lasers according to each of the above-described embodiments and modifications of the present technology can be applied to, for example, an electronic device that emits laser light, such as a time of flight (TOF) sensor. In a case where the present technology is applied to a TOF sensor, for example, the present technology can be applied to a distance image sensor by a direct TOF measurement method and a distance image sensor by an indirect TOF measurement method. In the distance image sensor by the direct TOF measurement method, since the arrival timing of the photon is directly obtained in the time domain in each pixel, a light pulse having a short pulse width is transmitted from the light source, and an electrical pulse is generated in the light receiving element. The present disclosure can be applied to the light source at that time. Furthermore, in the indirect TOF method, the flight time of light is measured using a semiconductor element structure in which the detection and accumulation amount of carriers generated by light change depending on the arrival timing of light. The present disclosure can also be applied as a light source in the case of using such an indirect TFO method.

The surface emitting laser according to the present technology may be realized as a light source of the TOF sensor mounted on any type of mobile body such as an automobile, an electric vehicle, a hybrid electric vehicle, a motorcycle, a bicycle, a personal mobility, an airplane, a drone, a ship, and a robot.

The surface emitting laser according to the present technology may be realized as a light source of a device (for example, a laser printer, a laser copier, a projector, a head-mounted display, a head-up display, or the like) that forms or displays an image by laser light.

According to the electronic device including the surface emitting laser as described above, since the surface emitting laser 10 is provided, low power consumption can be achieved.

Each embodiment and each modification described above can be combined within a range not contradictory to each other.

In each of the above-described embodiments and modifications, specific numerical values, shapes, materials (including compositions), and the like described are merely examples, and the present technology is not limited thereto.

Furthermore, the present technology can also have the following configurations.

(1) A surface emitting laser including:
a first multilayer film reflector;
a second multilayer film reflector; and
an active layer disposed between the first multilayer film reflector and the second multilayer film reflector,
in which in the first multilayer film reflector and/or the second multilayer film reflector, a high-concentration impurity region having a higher impurity concentration than other regions is partially provided in a thickness direction.

(2) The surface emitting laser according to (1), in which the high-concentration impurity region is partially provided in an in-plane direction of the first multilayer film reflector and/or the second multilayer film reflector.

(3) The surface emitting laser according to (1) or (2), in which the high-concentration impurity region is provided at least on a surface layer farther from the active layer of the first multilayer film reflector and/or the second multilayer film reflector.

(4) The surface emitting laser according to any one of (1) to (3), in which the high-concentration impurity region is not provided at least on a surface layer closer to the active layer of the first multilayer film reflector and/or the second multilayer film reflector.

(5) The surface emitting laser according to any one of (1) to (4), in which the first multilayer film reflector and/or the second multilayer film reflector includes: a first layer; and a second layer provided with the high-concentration impurity region.

(6) The surface emitting laser according to (5), in which the first layer and the second layer are laminated.

(7) The surface emitting laser according to (6), in which a lamination direction of the first layer and the second layer coincides with an arrangement direction of the first and second multilayer film reflectors and the active layer.

(8) The surface emitting laser according to any one of (5) to (7), in which the first layer is relatively closer to the active layer and the second layer is relatively farther from the active layer.

(9) The surface emitting laser according to any one of (5) to (8), in which the high-concentration impurity region is provided in an entire region of the second layer in a thickness direction.

(10) The surface emitting laser according to any one of (5) to (9), in which the high-concentration impurity region is not provided in the first layer.

(11) The surface emitting laser according to any one of (5) to (10), in which an optical thickness of the second layer is thinner than an optical thickness of the first layer.

(12) The surface emitting laser according to any one of (5) to (11), in which one or more pairs of undoped or lightly doped refractive index layers of $1\times10^{18}$ cm$^{-3}$ or less or undoped or lightly doped GaAs layers of $1\times10^{18}$ cm$^{-3}$ or less are disposed between the second layer and the active layer.

(13) The surface emitting laser according to (12), in which the refractive index layer or the GaAs layer is disposed between the second layer and the first layer.

(14) The surface emitting laser according to any one of (5) to (13), in which the first layer has one or more pairs of refractive index layers, at least one of which contains Al in a composition, the second layer has one or more pairs of refractive index layers, at least one of which contains Al in a composition, and a ratio of an optical thickness of a refractive index layer having a higher Al composition to an optical thickness of a refractive index layer having a lower Al composition in the pairs of the second layer is larger than a ratio of an optical thickness of a refractive index layer having a higher Al composition to an optical thickness of a refractive index layer having a lower Al composition in the pairs of the first layer.

(15) The surface emitting laser according to (14), in which a sum of optical thicknesses of the refractive index layers constituting the pairs of the first layer and a sum of optical thicknesses of the refractive index layers constituting the pairs of the second layer are substantially the same.

(16) The surface emitting laser according to any one of (5) to (15), in which a ratio of an optical thickness of a refractive index layer having a higher Al composition in the pairs of the second layer to an optical thickness of a refractive index layer having a higher Al composition in the pairs of the first layer is 1.2 or more.

(17) The surface emitting laser according to (5) to (16), in which a ratio of an optical thickness of a refractive index layer having a lower Al composition in the pairs of the second layer to an optical thickness of a refractive index layer having a lower Al composition in the pairs of the first layer is 0.8 or less.

(18) The surface emitting laser according to any one of (14) to (17), further including a standing wave adjustment layer disposed between the second layer and the first layer.

(19) The surface emitting laser according to (18), in which the standing wave adjustment layer has a layer containing Al in a composition, and an optical thickness of the layer containing Al in the composition is thicker than an optical thickness of a refractive index layer having a higher Al composition in the pairs of the first layer, and is thinner than an optical thickness of a refractive index layer having a higher Al composition in the pairs of the second layer.

(20) The surface emitting laser according to (18) or (19), in which the standing wave adjustment layer has a layer containing Al in a composition, and an optical thickness of the layer containing Al in the composition is thinner than an optical thickness of a refractive index layer having a lower Al composition in the pairs of the first layer, and is thicker than an optical thickness of a refractive index layer having a lower Al composition in the pairs of the second layer.

(21) The surface emitting laser according to any one of (14) to (20), in which the refractive index layer having a higher Al composition in the second layer has an Al composition of 90% or more.

(22) The surface emitting laser according to any one of (14) to (21), in which the refractive index layer having a lower Al composition in the second layer has an Al composition of 3% or more.

(23) The surface emitting laser according to any one of (1) to (22), in which the first multilayer film reflector and/or the second multilayer film reflector includes an AlGaAs-based compound semiconductor, an AlGaInP-based compound semiconductor, or an AlGaN-based compound semiconductor.

(24) The surface emitting laser according to any one of (1) to (23), in which the surface emitting laser has an oscillation wavelength of 900 nm or more.

(25) The surface emitting laser according to (8), in which the high-concentration impurity region includes a protrusion protruding from the second layer to a side opposite to the first layer side.

(26) The surface emitting laser according to (25), in which a contact layer is disposed on a side opposite to the active layer side with respect to the second multilayer film reflector, and at least a part of the protrusion is disposed in the contact layer.

(27) The surface emitting laser according to any one of (1) to (26), in which a mesa structure is formed including at least a part of the first multilayer film reflector, the active layer, and the second multilayer film reflector, and the high-concentration impurity region is provided in a peripheral portion of the mesa structure.

(28) The surface emitting laser according to (27), in which a current confinement layer in which an oxidized region surrounds a non-oxidized region is disposed in the second multilayer film reflector, and the high-concentration impurity region is provided so as to surround the non-oxidized region when viewed from the height direction of the mesa structure.

(29) The surface emitting laser according to (28), in which a difference between an outer diameter and an inner diameter of the high-concentration impurity region is 1 μm or more.

(30) The surface emitting laser according to any one of (1) to (29), further including an electrode in contact with the high-concentration impurity region.

(31) A surface emitting laser array in which the surface emitting lasers according to any one of (1) to (30) are two-dimensionally arranged.

(32) An electronic device including the surface emitting laser according to any one of (1) to (31).

(33) A method for manufacturing a surface emitting laser, the method including:
 a step of generating a laminate by laminating at least a first multilayer film reflector, an active layer, and a second multilayer film reflector in this order;
 a step of forming an insulating film on a side opposite to the active layer side with respect to the second multilayer film reflector of the laminate;
 a step of etching the insulating film to form an opening; and
 a step of diffusing impurities into a part of a layer including a surface layer farther from the active layer of the second multilayer film reflector via the opening.

(34) The method for manufacturing a surface emitting laser according to (33), in which in the step of diffusing the impurities, the impurities are not diffused at least into a surface layer relatively closer to the active layer of the second multilayer film reflector.

(35) The method for manufacturing a surface emitting laser according to (33) or (34), in which in the step of generating the laminate, a diffusion suppression layer that suppresses diffusion of the impurities is laminated on the active layer before all of the second multilayer film reflector is laminated on the active layer.

(36) The method for manufacturing a surface emitting laser according to any one of (33) to (35), in which in the step of generating the laminate, a contact layer is further laminated on the side opposite to the active layer side with respect to the second multilayer film reflector, and in the step of diffusing the impurities, the impurities are diffused into a part of a layer including the contact layer and the surface layer farther from the active layer of the second multilayer film reflector.

(37) The method for manufacturing a surface emitting laser according to any one of (33) to (36), in which
 the second multilayer film reflector includes a first layer and a second layer provided with a high-concentration impurity region having a higher impurity concentration than other regions,
 the first layer has one or more pairs of refractive index layers, at least one of which contains Al in a composition,
 the second layer has one or more pairs of refractive index layers, at least one of which contains Al in a composition,
 a ratio of an optical thickness of a refractive index layer having a higher Al composition to an optical thickness of a refractive index layer having a lower Al composition in the pairs of the second layer is larger than a ratio of an optical thickness of a refractive index layer having a higher Al composition to an optical thickness of a refractive index layer having a lower Al composition in the pairs of the first layer, and
 in the step of generating the laminate, the first layer is laminated on the active layer, a standing wave adjustment layer is laminated on the first layer, and the second layer is laminated on the standing wave adjustment layer.

REFERENCE SIGNS LIST 10, 10', 10", 20, 30, 40, 50, 60 Surface emitting laser
100 Substrate
200 First multilayer film reflector
300 Active layer
400 Current confinement layer
500, 500' Second multilayer film reflector
500a First layer
500b Second layer
600 Contact layer
650 Insulating film
700 Anode electrode (electrode)
Ir High-concentration impurity region

The invention claimed is:
1. A surface emitting laser, comprising:
 a first multilayer film reflector;
 a second multilayer film reflector; and
 an active layer between the first multilayer film reflector and the second multilayer film reflector, wherein at least one of the first multilayer film reflector or the second multilayer film reflector includes
a high-concentration impurity region having a higher impurity concentration than other regions is partially in a thickness direction,
a first layer that has one or more pairs of refractive index layers, and
a second layer that has the high-concentration impurity region and one or more pairs of refractive index layers, wherein
at least one of the one or more pairs of refractive index layers of the first layer contains Al in a composition,
at least one of the one or more pairs of refractive index layers of the second layer contains Al in a composition, and
a ratio of an optical thickness of a refractive index layer having a higher Al composition to an optical thickness of a refractive index layer having a lower Al composition in the one or more pairs of refractive index layers of the second layer is larger than a ratio of an optical thickness of a refractive index layer having a higher Al composition to an optical thickness of a refractive index layer having a lower Al composition in the one or more pairs of refractive index layers of the first layer.

2. The surface emitting laser according to claim 1, wherein the high-concentration impurity region is partially in an in-plane direction of the at least one of the first multilayer film reflector or the second multilayer film reflector.

3. The surface emitting laser according to claim 1, wherein the high-concentration impurity region is at least on a surface layer farther from the active layer of the at least one of the first multilayer film reflector or the second multilayer film reflector.

4. The surface emitting laser according to claim 1, wherein the high-concentration impurity region is not provided at least on a surface layer closer to the active layer of the at least one of the first multilayer film reflector or the second multilayer film reflector.

5. The surface emitting laser according to claim 1, wherein the first layer is relatively closer to the active layer and the second layer is relatively farther from the active layer.

6. The surface emitting laser according to claim 1, wherein one or more pairs of undoped or lightly doped refractive index layers of $1\times10^{18}$ cm$^{-3}$ or less or undoped or lightly doped GaAs layers of $1\times10^{18}$ cm$^{-3}$ or less are between the second layer and the active layer.

7. The surface emitting laser according to claim 6, wherein the one or more pairs of undoped or lightly doped refractive index layers or the undoped or lightly doped GaAs layers is between the second layer and the first layer.

8. The surface emitting laser according to claim 1, wherein a sum of optical thicknesses of the one or more pairs of refractive index layers of the first layer and a sum of optical thicknesses of the one or more pairs of refractive index layers of the second layer are substantially same.

9. The surface emitting laser according to claim 1, further comprising a standing wave adjustment layer between the second layer and the first layer.

10. The surface emitting laser according to claim 9, wherein
the standing wave adjustment layer has a layer containing Al in a composition,
an optical thickness of the layer containing Al in the composition is thicker than an optical thickness of a refractive index layer having a higher Al composition in the one or more pairs of refractive index layers of the first layer, and
the optical thickness of the layer containing Al in the composition is thinner than an optical thickness of a refractive index layer having a higher Al composition in the one or more pairs of refractive index layers of the second layer.

11. The surface emitting laser according to claim 9, wherein
the standing wave adjustment layer has a layer containing Al in a composition,
an optical thickness of the layer containing Al in the composition is thinner than an optical thickness of a refractive index layer having a lower Al composition in the one or more pairs of refractive index layers of the first layer, and
the optical thickness of the layer containing Al in the composition is thicker than an optical thickness of a refractive index layer having a lower Al composition in the one or more pairs of refractive index layers of the second layer.

12. The surface emitting laser according to claim 1, wherein the surface emitting laser has an oscillation wavelength of one of 900 nm or more.

13. A surface emitting laser array in which a plurality of surface emitting lasers according to claim 1 are two-dimensionally arranged,
wherein the plurality of surface emitting lasers includes the surface emitting laser.

14. An electronic device, comprising:
the surface emitting laser according to claim 1.

15. A method for manufacturing a surface emitting laser, the method comprising:
generating a laminate by laminating at least a first multilayer film reflector, an active layer, and a second multilayer film reflector in this order;
forming an insulating film on a side opposite to a side of the active layer with respect to the second multilayer film reflector of the laminate;
etching the insulating film to form an opening; and
diffusing impurities into a part of a layer including a first surface layer farther from the active layer of the second multilayer film reflector via the opening, wherein
the second multilayer film reflector includes a first layer and a second layer provided with a high-concentration impurity region having a higher impurity concentration than other regions,
the first layer has one or more pairs of refractive index layers,
at least one of the one or more pairs of refractive index layers of the first layer contains Al in a composition,
the second layer has one or more pairs of refractive index layers,
at least one of the one or more pairs of refractive index layers of the second layer contains Al in a composition, and
a ratio of an optical thickness of a refractive index layer having a higher Al composition to an optical thickness of a refractive index layer having a lower Al composition in the one or more pairs of refractive index layers of the second layer is larger than a ratio of an optical thickness of a refractive index layer having a higher Al composition to an optical thickness of a refractive index layer having a lower Al composition in the one or more pairs of refractive index layers of the first layer.

16. The method for manufacturing the surface emitting laser according to claim 15, wherein in the diffusing of the impurities, the impurities are not diffused at least into a second surface layer relatively closer to the active layer of the second multilayer film reflector.

17. The method for manufacturing the surface emitting laser according to claim 15, wherein in the generating of the laminate, a diffusion suppression layer that suppresses diffusion of the impurities is laminated on the active layer before all of the second multilayer film reflector is laminated on the active layer.

18. The method for manufacturing the surface emitting laser according to claim 15, wherein
in the generating of the laminate, the first layer is laminated on the active layer, a standing wave adjustment layer is laminated on the first layer, and the second layer is laminated on the standing wave adjustment layer.

* * * * *